(12) United States Patent
Takahashi et al.

(10) Patent No.: US 6,418,661 B1
(45) Date of Patent: Jul. 16, 2002

(54) HYDROTALCITE COMPOUND, PROCESS FOR PRODUCING THE SAME, AND AGRICULTURAL FILM CONTAINING THE SAME

(75) Inventors: Hideo Takahashi, Sakaide; Akira Okada, Takamatsu, both of (JP)

(73) Assignee: Kyowa Chemical Industry Co Ltd, Kanagawa (JP)

( * ) Notice: Subject to any disclaimer, the term of this patent is extended or adjusted under 35 U.S.C. 154(b) by 0 days.

(21) Appl. No.: 09/601,362

(22) PCT Filed: Nov. 29, 1999

(86) PCT No.: PCT/JP99/06651

§ 371 (c)(1),
(2), (4) Date: Aug. 1, 2000

(87) PCT Pub. No.: WO00/32515

PCT Pub. Date: Jun. 8, 2000

(30) Foreign Application Priority Data

Jan. 12, 1998 (JP) ............................................. 10-355454
Apr. 22, 1999 (JP) .............................................. 9-115178
Oct. 28, 1999 (JP) .............................................. 9-307498

(51) Int. Cl.$^7$ ........................... C01B 33/26; A01G 7/00; C08K 5/3435
(52) U.S. Cl. ........................... 47/9; 423/306; 423/327.1; 423/328.1; 423/328.2; 252/587; 523/135; 524/405; 524/417; 524/423; 524/424; 524/435; 524/436; 524/450
(58) Field of Search ............................... 523/135; 47/9; 524/417, 423, 424, 435, 436, 437, 450, 405; 252/400.3, 400.4, 400.52, 587; 423/332, 279, 306, 331, 328.1, 328.2, 327.1

(56) References Cited

U.S. PATENT DOCUMENTS

| 4,729,854 | A | * | 3/1988 | Miyata et al. |
| 4,883,533 | A | * | 11/1989 | Kosih et al. |
| 4,967,018 | A | * | 10/1990 | Soo et al. |
| 5,232,683 | A | * | 8/1993 | Clark et al. |
| 5,326,891 | A | * | 7/1994 | Breuer et al. |
| 5,356,567 | A | * | 10/1994 | Ogawa et al. |
| 5,356,982 | A | * | 10/1994 | Razvan et al. |
| 5,399,329 | A | * | 3/1995 | Schutz et al. |
| 5,416,141 | A | * | 5/1995 | Endres et al. |
| 5,578,286 | A | * | 11/1996 | Martin et al. |
| 5,767,179 | A | * | 6/1998 | Takado et al. |
| 5,776,424 | A | * | 7/1998 | Martin et al. |
| 5,840,792 | A | * | 11/1998 | Machimura et al. |
| 5,941,037 | A | * | 8/1999 | Hallock et al. |
| 6,306,494 | B1 | * | 10/2001 | Takahashi et al. |

FOREIGN PATENT DOCUMENTS

| DE | 4425266 | * | 10/1995 |
| JP | 09-279124 | * | 10/1997 |
| JP | 09-302158 | * | 11/1997 |
| JP | 10-052895 | * | 2/1998 |

* cited by examiner

Primary Examiner—Veronica P. Hoke
(74) Attorney, Agent, or Firm—Sherman & Shalloway

(57) ABSTRACT

A hydrotalcite compound which has the excellent ability to absorb infrared rays and has excellent light transmission when contained in an agricultural film; a process for producing the compound; and an infrared absorber and an agricultural film both containing the compound. The hydrotalcite compound is characterized by retaining as the interlayer anions at least one kind of anions selected among ions of silicon-, phosphorus-, and boron-containing polymeric oxyacids and another kind of anions.

53 Claims, 3 Drawing Sheets

HYDROTALCITE COMPOUND, PROCESS FOR PRODUCING THE SAME, AND AGRICULTURAL FILM CONTAINING THE SAME

TECHNICAL FIELD

This invention relates to hydrotalcite compound which has excellent infrared absorption ability and a characteristic property of exhibiting excellent light-transmission when it is contained in agricultural film; a process for producing the same; infrared absorbing agent containing said hydrotalcite compound as the active ingredient; and agricultural film which contains said infrared absorbing agent.

BACKGROUND ART

Agricultural films have been widely used for greenhouse cultivation or tunnel cultivation of agricultural products. Those agricultural films are required to concurrently exhibit good light transmission and heat insulating property. That is, temperatures within a greenhouse or tunnel which are raised by the daytime sunbeams of 0.29–4.3 μm in wavelength rapidly drop in night, in particular, clear weather night, due to radiational cooling. Such rapid temperature drop inside a greenhouse or tunnel incurs adverse effect on growth of crops. While various causes are considered to induce the rapid temperature drop, there is an opinion that heat radiation from surface of the earth or cultivated plants to the outside atmosphere (radiation as long wavelength infrared rays) in nights is the reason for the temperature drop. According to that view, the heat radiation is calculated, using Planck's formula, i.e., the following formula (3), as black body radiation energy:

$$E\lambda \cdot d\lambda (\text{erg. sec}^{-1}.\text{cm}^{-2}) \ E\lambda \cdot d\lambda = 2\pi hC^2/[\lambda^5\{e^{(hC/\lambda kT)}-1\}]\cdot d\lambda \quad (3)$$

in which

λ: wavelength h: Planck's constant

C: velocity of light in vacuum k: Boltzmann's constant

T: absolute temperature.

From the calculation, it is explained that the rays of wavelengths within the infrared region, in particular, infrared rays (black body radiation energy) of 400–2000 cm$^{-1}$, the maximum being at 1000 cm$^{-1}$, are said to be emitted within the temperature range of from 30 to −10° C. to induce the temperature drop.

For preventing such rapid temperature drop inside a greenhouse or tunnel, heat insulating film having infrared-absorbing ability is used. Such heat insulating film is provided by either using, as thermoplastic resin which is the base material, the one having infrared absorbing ability itself or the one to which a substance having ability to absorb infrared rays (in particular, rays of wave-lengths ranging 400–2000 cm$^{-1}$), i.e., an infrared absorbing agent, is blended so as to impart to the film infrared absorbability. As infrared absorbers, for example, silica; silicate; hydroxide, oxide, aluminate, borate or sulfate of lithium, calcium, magnesium or aluminium; or hydrotalcite compounds are used.

Of those, hydrotalcite compounds excel in infrared absorbing ability and light transmission when blended in resin, over those of silica; silicate; or hydroxide, oxide, aluminate, borate or sulfate of lithium, calcium, magnesium or aluminium and, therefore, are particularly useful as infrared absorbing agents, and many patent applications have been filed on inventions relating thereto. (Hydrotalcites are complex hydroxide having lamellar structures formed of complex hydroxide layers (base layers) of Mg and Al, separated by interlayer wherein holding anions (e.g., carbonate ions) and water. Those which are represented by the formulae (1) or (4) in the present specification are complex hydroxides having base layers formed of Mg and Al; or Mg, other divalent metal(s) and Al, holding anions and water in the interlayer. Whereas, those represented by the formulae (2) or (5) also are complex hydroxides differing in composition of the base layers, having base layers formed of Li and Al; or Li, other divalent metal(s) and Al, holding anions and water in the interlayer. All of those have structures similar or analogous to those of hydrotalcite, and hence they are collectively referred to as "hydrotalcite compounds" in the present specification. Those which are expressed by the formula (1) or (4) are referred to as Mg—Al hydrotalcite compounds, and those of formula (2) or (5), as Li—Al hydrotalcite compounds).

Among patent applications filed in the past on inventions relating to Mg—Al hydrotalcite compounds, there are, for examples, Sho 62 (1987)-31744B-JP (corres. to U.S. Pat. No. 4,686,791 and EP 142,773), Sho 62-53543B-JP, Sho 62-41247B-JP, Sho 63 (1988)-175072B-JP, Sho 63-115743B-JP, Sho 63-149147B-JP, Sho 63-149148B-JP, Sho 64 (1989)-6041B-JP, Hei 4 (1992)-11107B-JP, Hei 6 (1994)-6363B-JP, Hei 6-6364B-JP and Hei 9 (1997)-176390A-JP. Examples of those relating to Li—Al hydrotalcite compounds include: Hei 7 (1995)-300313A-JP (corres. to EP 672,619), Hei 9 (1997)-142835A-JP (corres. to EP 790,214), Hei 9-279124A-JP, Hei 9-800828A (second)-JP (corres. to U.S. Pat. No. 5,767,179 and EP 778,241) [This is the domestic republication of PCT international publication for the patent application. Similar case shall be hereafter marked as "A (second)"], Hei 9 (1997)-235420A-JP (corres. to EP 781,800), Hei 10 (1998)-52895A-JP, Hei 10-235776A-JP and Hei 10-226739A-JP.

While the hydrotalcite compounds are expressed by various structural formula in these patent applications, they can be generally represented by the following formula (4) or (5).

(General formula of Mg—Al hydrotalcite compounds):

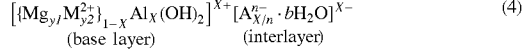
(4)

in the above formula,

M$^{2+}$ stands for at least one kind of divalent metal ion of Zn, Ca and Ni,

A$^{n-}$ stand for a n-valent anion of, e.g., inorganic or organic acid such Cl$^-$, Br$^-$, I$^-$, NO$_3^-$, ClO$_4^-$, H$_2$PO$_4^-$, HBO$_3^{2-}$, SO$_4^{2-}$, CO$_3^{2-}$, SiO$_3^{2-}$, HPO$_4^{2-}$, PO$_4^{3-}$, Fe(CN)$_6^{3-}$ and Fe(CN)$_4^{4-}$, and x, y$_1$, y$_2$ and b are positive numbers each satisfying the following conditions, respectively, 0<x≦0.5, y$_1$+y$_2$=1, y$_1$≦1, y$_2$<1, 0≦b<2.

(General formula of Li—Al hydrotalcite compounds)

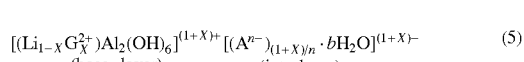
(5)

in which

G$^{2+}$ stands for at least one kind of divalent metal ion of Mg, Zn, Ca and Ni, A$^{n-}$ stands for a n-valent anion, and x and b are positive numbers each satisfying the following conditions, respectively, 0≦x<1, 0≦b<5.

Of these, in most cases hydrotalcite compounds having carbonate ions in the interlayer (which are hereafter referred to as carbonate ion-type hydrotalcite compounds) are used.

Taking examples of carbonate ion-type Mg—Al hydrotalcite compounds, however, while they exhibit favorable absorption of infrared rays around 400–800 cm$^{-1}$ and 1400 cm$^{-1}$, the absorbing ability of the infrared rays of 900 to around 1300 cm$^{-1}$ is poor. When they are contained in agricultural film whose base material is polyethylene exhibiting infrared absorption at around 700 and 1300–1500 cm$^{-1}$ only, the agricultural film exhibits combined infrared absorption of that of the polyethylene and that of the infrared absorbing agent and hence shows poor infrared absorption in the vicinity of 900–1300 cm$^{-1}$, i.e., poor heat-insulation property. Also carbonate ion-type Li—Al hydrotalcite compounds show infrared absorbing ability at around 1000 cm$^{-1}$ which however is not strong, and their over-all infrared absorbing ability is about the same as that of carbonate ion type Mg—Al hydrotalcite compounds. Agricultural films containing those compounds, furthermore, are considered to exhibit better light transmission compared to that of the films containing other infrared absorbing agents, but still the light transmission is not fully satisfactory.

As a means to enhance the infrared absorbing ability of Mg—Al hydrotalcite compounds, Sho 62 (1987)-31744B-JP (corres. to U.S. Pat. No. 4,686,791 and EP 142,773) proposed to impart thereto the ability to absorb infrared rays around 900–1300 cm$^{-1}$ by having them contain $H_2PO_4^-$, $HPO_4^{2-}$, $PO_4^{3-}$, $HBO_3^{2-}$ or $SiO_3^{2-}$ and the like, i.e., those normally referred to as silicon-, phosphorus- and boron-containing monomeric oxygen acid ions, in the interlayer. A similar proposal was made also as to Li—Al hydrotalcite compounds. However, when hydrotalcite compounds containing these anions are used as infrared absorbing agents in agricultural film, some improvement in heat insulation of the film is achieved but it is still not fully satisfactory. Furthermore, the ability to impart light transmission to film is either equivalent or inferior to that of conventional carbonate ion-type hydrotalcite compounds.

Recently, proposals for further improving infrared absorption of hydrotalcite compounds are made in Hei 8 (1996)-217912A-JP (corres. to EP 708,056) or Hei 9 (1997)-800828A (second)-JP (corres. to U.S. Pat. No. 5,767,179 and EP 778,241), according to which condensed silicate ions and/or condensed phosphate ions (which are hereafter referred to as silicon- and/or phosphorus-containing polymerized oxygen acid ion) are caused to be present as the interlayer anions of hydrotalcite compounds. The object of these proposals is to improve the infrared absorption by having the compounds contain more silicon- or phosphorus-containing oxygen acid ions in their interlayer, by the use of silicon- or phosphorus-containing polymerized oxygen acid ions. It is furthermore alleged that those methods can approximate refractive indices of the resulting hydrotalcite compounds to those of thermoplastic resins constituting agricultural films and hence can improve light transmission of the films which contain said hydrotalcite compounds. More specifically, while spacing of carbonate ion-type hydrotalcite compounds is about 7.6 Å at (003) plane or (002) plane, and their refractive index ranges 1.51–1.53, those hydrotalcite compounds shown in Hei 8-217912A-JP (corres. to EP 708,056) or Hei 9-800828A (second)-JP (corres. to U.S. Pat. No. 5,767,179 and EP 778,241), e.g., those having silicon-containing polymerized oxygen acid ions, have increased spacing of 11.9 Å at the maximum at (003) or (002) planes, and whereby their refractive index decreases to 1.49–1.52. Refractive index of thermoplastic resin useful for agricultural film, e.g., an ethylene-vinyl acetate copolymer, is said to be 1.49–1.50. Hence agricultural films containing the hydrotalcite compounds as exemplified in above two published patent applications are said to exhibit improved light transmission.

However, our reproduction testing of such agricultural films has revealed: although the agricultural films exhibited improved infrared absorption, their light transmission again was at equivalent or inferior level as compared to that of films containing conventional hydrotalcite compounds. While the reason for the absence of improvement in light transmission of the film is not yet fully clear, one of suspected causes is the processing temperature used in the occasion of kneading such a silicon- or phosphorus-containing polymerized oxygen acid ion-carrying hydrotalcite compound into the resin serving as the material for agricultural film, as disclosed in said two published applications.

Thus, none of known infrared absorbing agent in the past could fully satisfy both of the property requirements to have excellent infrared absorption and, when contained in agricultural film, to impart good light transmission to the film.

DISCLOSURE OF THE INVENTION

The object of the present invention is to provide a substance which has excellent infrared absorbing ability and also is capable of imparting excellent light transmission to an agricultural film containing said substance; a process for production thereof, an infrared absorbing agent containing the substance as the active ingredient; and an agricultural film containing said infrared absorbing agent, which concurrently exhibits excellent heat insulation property and excellent light transmission.

We have engaged in research work aiming at accomplishing the above object, to discover that a hydrotalcite compound which is expressed by the following formula (1) or (2) and which holds in its interlayer at least a kind of anions selected from silicon-, phosphorus and boron-containing oxygen acid ions, at least a part of said anions being at least one of silicon-, phosphorus- and boron-containing polymerized oxygen acid ions; and other kind or kinds or anions, exhibits excellent infrared absorbing ability and is capable of imparting excellent light transmission to an agricultural film containing the same. The invention is thus completed. When said hydrotalcite compound is contained in agricultural film as an infrared absorbing agent, a film excelling in heat insulation as well as in light transmission is obtained:

(Mg—Al hydrotalcite compound)

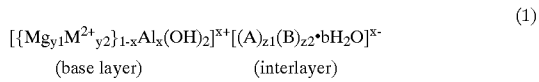

$$[\{Mg_{y1}M^{2+}{}_{y2}\}_{1-x}Al_x(OH)_2]^{x+}[(A)_{z1}(B)_{z2} \cdot bH_2O]^{x-} \quad (1)$$

(base layer)　　　　(interlayer)

in which $M^{2+}$ stands for at least a kind of divalent metal ion of Zn, Ca and Ni, A stands for at least a kind of anion selected from silicon-, phosphorus- and boron-containing oxygen acid ions, at least a part of which being at least a kind of anion selected from silicon-, phosphorus- and boron-containing polymerized oxygen acid ions, B stands for at least a kind of anion other than the A, and $x, y_1, y_2, z_1, z_2$ and b each satisfies the following condition or conditions:

$x$: $0 < x \leq 0.5$, $y_1$ and $y_2$: $y_1 + y_2 = 1$, $0 < y_1 \leq 1$, $0 \leq y_2 < 1$, $z_1$ and $z_2$: $0 < z_1$, $0 < z_2$, $b$: $0 \leq b < 2$.

(Li—Al hydrotalcite compound)

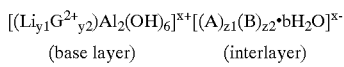

(2)

(base layer) (interlayer)

in which
G$^{2+}$ stands for at least a kind of divalent metal ion of Mg, Zn, Ca and Ni, A stands for at least a kind of anion selected from silicon-, phosphorus- and boron-containing oxygen acid ions, at least a part of which being at least a kind of anion selected from silicon-, phosphorus- and boron-containing polymerized oxygen acid ions, B stands for at least an anion other than the A, and $y_1$, $y_2$, x, $z_1$, $z_2$ and b each satisfies the following condition or conditions:

$y_1$ and $y_2$: $0<y_1\leq 1$, $0<y_2<1$,
$0.5\leq(y_1+y_2)\leq 1$,
x: $x=y_1+2y_2$
$z_1$ and $z_2$: $0<z_1$, $0<z_2$,
b: $0\leq b<5$.

That is, the hydrotalcite compound of the invention contains between its base layers: as A, at least a kind of anion selected from silicon-, phosphorus- and boron-containing oxygen acid ions, at least a part of which being at least a kind of anion selected from silicon-, phosphorus- and boron-containing polymerized oxygen acid ions (which anions being hereafter referred to as "A anions") and as B, anion or anions other than A ("B anions"), which characteristically exhibits concurrently excellent infrared absorption and an ability to impart excellent light transmission to agricultural film containing same. Such combination of properties has never been obtained when any known hydrotalcite compounds containing various ions, or those containing silicon- or phosphorus-containing polymerized oxygen acid ions as disclosed in Hei 8-217912A-JP (corres. to EP 708,056) or Hei 9-800828A (second)-JP (corres. to U.S. Pat. No. 5,767,179 and EP 778,241), or their combinations are used as infrared absorbing agent.

The reason for these advantageous properties is not yet 10 fully clear. Whereas, those hydrotalcite compounds carrying silicon- or phosphorus-containing polymerized oxygen acid ions as disclosed in Hei 8-217912A-JP (corres. to EP 708,056) or Hei 9-800828A (second)-JP (corres. to U.S. Pat. No. 5,767,179 and EP 778,241) and which contain a large amount of interlayer water have notably widened spacing as aforesaid, and their refractive index is approximate to that of thermoplastic resins which are used for agricultural films. Due to so widened spacing, according to DTA (differential thermal analysis) the interlayer water is released at temperatures not higher than 150° C. On the other hand, in the occasion of blending an infrared absorbing agent into thermoplastic resin to be used for agricultural film, normally they are kneaded at processing temperatures ranging 140–200° C. Hence, when said hydrotalcite compound is blended as an infrared absorbing agent in a thermoplastic resin to be used to make agricultural film, the interlayer water in the infrared absorbing agent is released under the processing temperature of 140–200° C. to once again narrow the widened spacing. In consequence, its refractive index also largely changes, and eventually when the composition is processed to a film, the film presumably comes to exhibit poor light transmission. This assumption is supported also by the phenomenon that the percent transmission of the film further drops when interlayer water of the infrared absorbing agent is removed in advance of its kneading into the thermoplastic resin and the kneaded composition is processed into film. Furthermore, the infrared absorbing agent contains large amounts of silicon- or phosphorus-containing polymerized oxygen acid ions, which allows a prediction that locally silicate or phosphate compounds are formed inside the crystals (interlayer) during synthesis of the compound or during the release of interlayer water under the heat treatment, and so formed silicate or phosphate compounds may adversely affect light transmission of the product film.

Separately from above assumptions, it is known that interlayer water of hydrotalcite compounds containing anions other than A anions, for example, sulphate ion, carbonate ion, chloride ion or nitrate ion, is released at around 200–240° C. The hydrotalcite compound of the invention contains both A anions and B anions and, for example, when it contains as B anions sulphate ion, carbonate ion, chloride ion, nitrate ion and the like, the property of hydrotalcite compound having such ions at its interlayer is added to the hydrotalcite compound of the invention. Consequently, even under the processing temperature of 140–200° C. it retains a part of interlayer water to alleviate the narrowing ratio of the spacing and in consequence reduces the change in refractive index. Hence when the compound of the present invention is blended in agricultural film as an infrared absorbing agent, it presumably exhibits little adverse effect on light transmission of the film. Also because the hydrotalcite compound of the invention uniformly contains the plural kinds of anions in the interlayer, presumably formation of silicate compound or phosphate compound scarcely takes place.

The interlayer B anions in the hydrotalcite compound of the invention is at least a kind of anion other than A anions, i.e., other than silicon-, phosphorus- and boron-containing oxygen acid ions, preferably those selected from sulphate ion, carbonate ion, chloride ion and nitrate ion, inter alia, sulphate ion and carbonate ion.

When the compound of the invention is to be contained, for example, in resin, the compound preferably has an average secondary particle diameter of not more than 5 μm and a BET specific surface area of not more than 30 m$^2$/g, for favorable dispersibility. In order to further improve the dispersibility, it may be surface-treated with at least one member of the group consisting of higher fatty acids; anionic surfactants; phosphoric acid esters; nonionic surfactants, silane-, titanate- and aluminum-containing coupling agents; and fatty acid esters of polyhydric alcohols. Also for avoiding occurrence of foaming or fish-eye, the hydrotalcite compound of the invention which has been optionally surface-treated may be partially or entirely removed of the interlayer water by a heat-treatment.

The hydrotalcite compound of the present invention has excellent infrared absorbing ability and the property of imparting excellent light transmission to agricultural film which contains the same, and therefore is suitable as infrared absorbing agent for agricultural films. In particular, referring to the formulae (1) and (2), 20 those compounds whose electric charges fall within the range of $0.1\leq$(total electric charge number of (B)$z_1$)/x$\leq 0.8$ are preferred as infrared absorbing agent. Thus, an agricultural film which contains 1–30% by weight of a hydrotalcite compound of the invention to the thermoplastic resin constituting the film concurrently possesses excellent infrared absorbing ability and excellent light transmission.

The hydrotalcite compound of the present invention can be prepared by a process comprising preparing in advance a hydrotalcite compound whose interlayer anions are of at least one kind of anions other than A anions, for example, sulphate ions, carbonate ions, chloride ions, nitrate ions or an organic acid ions, and then exchanging some of them with A anions. In particular, it is preferred to first prepare a hydrotalcite compound whose interlayer anions are of at least one kind of selected from sulphate ion, carbonate ion, chloride ion and nitrate ion, and then exchanging a part of them with A anions. The optimum result can be obtained, furthermore, by preparing a hydrotalcite compound containing mainly sulphate ions at the time of the synthesizing reaction and then exchanging some of the sulphate ions with A anions, because it can be prepared with ease and at low cost, and furthermore it assists the infrared absorbing ability which shall be discussed later.

BEST MODE FOR CARRYING OUT THE INVENTION

Figure 1:
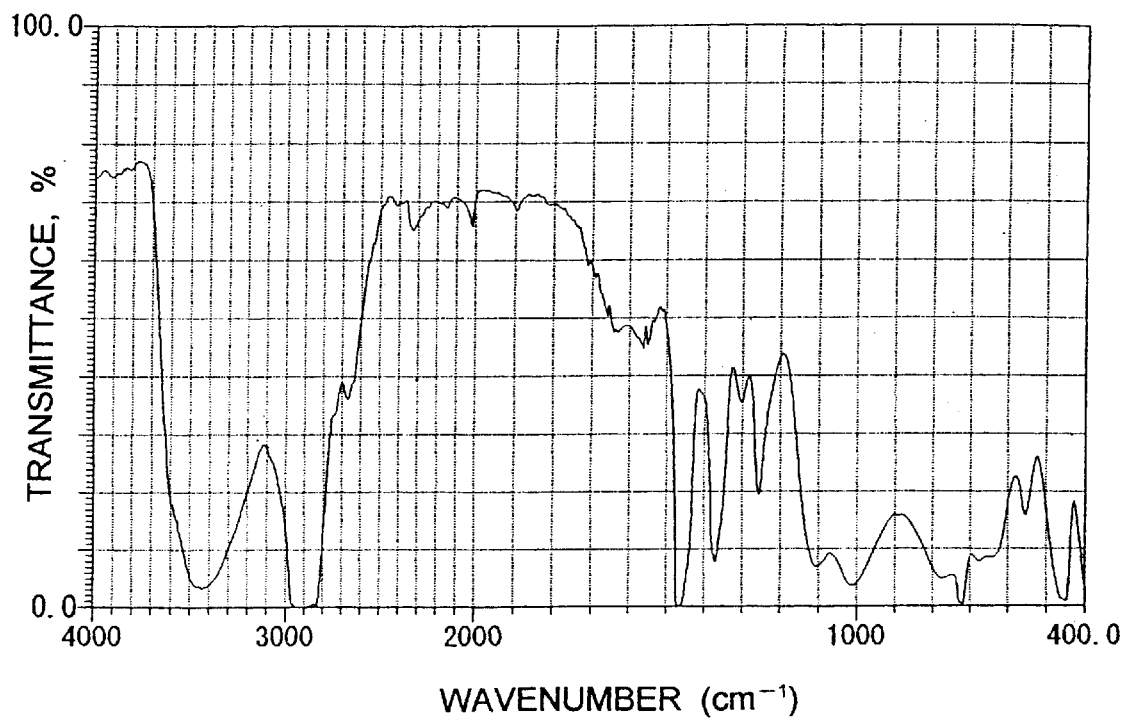
FIG. 1 is an IR absorption chart of a 100 $\mu$m-thick film of metallocene polyethylene (PE) containing 10% by weight of the hydrotalcite compound (powder) of the present invention as obtained in Example 2.

The hydrotalcite compound of the invention can be prepared as follows. For preparation of Mg—Al hydrotalcite compound, those methods as disclosed in Sho 47 (1972)-32198B-JP (corres. to U.S. Pat. No. 3,796,792), Sho 50 (1975)-30039B-JP, Sho 51 (1976)-29129B-JP, or Hei 4 (1992)-73457B-JP (corres. to U.S. Pat. No. 4,675,356 and EP 189,899) are known, according to which, by suitably selecting and reacting aqueous solutions of, for example, chloride, sulphate, nitrate, carbonate or hydroxide of Mg, $M^{2+}$ or Al and alkaline aqueous solutions of sodium hydroxide, sodium carbonate, sodium aluminate and the like, for example, slurry of Mg—Al hydrotalcite compound having sulphate ion, carbonate ion, chloride ion or nitrate ion at its interlayer can be synthesized. For example, where synthesis of a Mg—Al hydrotalcite having sulphate ions at its interlayer is intended, aqueous solutions of chlorides of Mg and $M^{2+}$, aluminium sulphate and sodium hydroxide are used in the reaction to provide the object product. The molar ratios among Mg, $M^{2+}$ and Al can be optionally selected within the ranges specified by formula (1). Whereas, x preferably is within the range of $0.2 \leq x \leq 0.5$, in particular, $0.2 \leq x \leq 0.4$, inter alia, $0.25 \leq x \leq 0.35$. Because those elements which are named as examples of $M^{2+}$ have atomic weights greater than that of Mg, when the molar ratio of $M^{2+}$ rises, the molecular weight of resulting Mg—Al hydrotalcite compound increases correspondingly, to eventually reduce infrared absorption of the infrared absorbing agent. Hence, lower molar ratio of $M^{2+}$ is preferred. More specifically $y_2 \leq 0.5$, in particular, $y_2 \leq 0.3$, is preferred. Subsequently, so synthesized slurry of Mg—Al hydrotalcite compound is given a hydrothermal treatment in an aqueous medium, under such conditions as: for example, at temperatures of about 120° C.–about 250° C. for about 1–about 40 hours, to form a slurry of Mg—Al hydrotalcite compound whose average secondary particle diameter and BET specific surface area are adjusted.

As methods for preparing Li—Al hydrotalcite compound, those disclosed in Hei 9 (1997)-142835A-JP (corres. to EP 790,214) or Hei 9-279124A-JP are known, according to which a slurry of Li—Al hydrotalcite compound having, for example, sulphate ion, carbonate ion, chloride ion or nitrate ion as interlayer anions, is synthesized through reaction of suitably selected aqueous solutions of, for example, chlorides, sulfates, nitrates, carbonates or hydroxides of Li, $G^{2+}$ and Al, or alkaline solutions of sodium hydroxide, sodium carbonate, sodium aluminate and the like. For example, when synthesis of a slurry of Li—Al hydrotalcite compound containing sulfate ions in its interlayer is intended, aqueous solutions of chlorides of Li and $G^{2+}$ and those of aluminium sulfate and sodium hydroxide are reacted to obtain the intended slurry. The molar ratio of Li $G^{2+}$, and Al can be optionally selected within the ranges specified by the formula (2). Whereas, as to $y_1+y_2$, $0.7 \leq (y_1+y_2) \leq 1$, in particular, $0.9 \leq (y_1+y_2) \leq 1$, inter alia. $0.95 \leq (y_1+y_2) \leq 1$ is preferred. The molr ratio between Li and $G^{2+}$ is preferably low, because a high molar ratio of $G^{2+}$ makes it difficult to maintain the structure of the Li—Al hydrotalcite compound. Hence, $y_2 \leq 0.5$, in particular, $y_2 \leq 0.2$, inter alia, $y_2 \leq 0.1$, is preferred. The resulting slurry of Li—Al hydrotalcite compound is then given a hydrothermal treatment in an aqueous medium, under such conditions as: at temperatures of about 80° C.–about 250° C. for about 1–about 40 hours, to form a slurry of Li—Al hydrotalcite compound whose average secondary particle diameter and BET specific surface area are adjusted.

Then, the slurry of Mg—Al or Li—Al hydrotalcite compound (excepting that of carbonate ion type) is mixed with a solution containing at least one of silicon-, phosphorus- and boron-containing oxygen acid ions, whereby the anions incorporated at the time of synthesis undergo ion-exchange with the silicon-, phosphorus- and boron-containing oxygen acid ions, allowing formation of a hydrotalcite compound having, for example, A anions and at least one of sulphate ion, carbonate ion, chloride ion and nitrate ion as the interlayer anions and having suitably adjusted average secondary particle diameter and BET specific surface area.

Furthermore, for effecting the ion-exchange to A anions in the slurry of a carbonate ion-type Mg—Al or Li—Al hydrotalcite compound which is synthesized by the above-described method, a part or whole of the interlayer carbonate ions are exchanged with sulphate ion, carbonate ion, chloride ion, nitrate ion or organic acid ion in advance using solutions of low molecular weight organic acids such as sulfuric, hydrochloric, nitric or acetic acids, followed by further ion-exchange using an alkaline substance such as sodium silicate, sodium phosphate or sodium borate. Or, partial ion-exchange with the carbonate ions may be directly carried out using an acid such as phosphoric acid.

In the above-described production methods, a surface-treating agent as described later may be added before the ion-exchange to A anions to effect a surface treatment and then to carry out the ion-exchange to A anions.

The hydrotalcite compound of the invention is not necessarily limited by the above-described production methods, but may be produced by still other methods. Actually, however, such other methods often invite rise in the material or production costs. Also among the above-described methods, the one which uses an acid is liable to injure crystalline structure of the hydrotalcite compound or to impair dispersibility of the compound. The use of acid may also give rise to a problem of carbon dioxide gas generation during the production. Hence, it is preferred to prepare hydrotalcite compounds other than carbonate ion-type, at the stage of the synthesizing reaction. In particular, preparation of hydrotalcite compound containing mainly sulphate ions as the interlayer anions is most convenient, because of ease and low costs and complementary effect for infrared absorption.

The ion-exchange to A anions can be effected by throwing solution containing at least one of silicon-, phosphorus- and boron-containing oxygen acid ions into said hydrotalcite compound slurry under stirring and continuing the stirring at normal temperature for a minute–24 hours, preferably at 60° C. or above (heating of the slurry may start before the addition of said oxygen acid ions) for 1–24 hours, in particular, at 70° C. or above for 1–24 hours, inter alia, at 80° C. or above for 1–24 hours. Whereas, when the temperature is 100° C. or above, use of a pressure vessel becomes necessary, and the stirring for longer than 24 hours is undesirable from the standpoint of productivity.

The A anions to be contained in the hydrotalcite compound of the present invention are silicon-, phosphorus- and boron-containing oxygen acid ions. For example, those containing silicon include monomeric oxygen acid ions or polymerized oxygen acid ions of the formulae $(Si_nO_{2n+1})^{2+}$ or $(HSi_nO_{2n+1})^-$ (n is an integer not less than 1), such as $SiO_3^{2-}$, $Si_2O_5^{2-}$, $Si_3O_7^{2-}$, $Si_4O_9^{2-}$, $(HSiO_3)^-$, $(HSi_2O_5)^-$ and the like may be named; as the phosphorus-containing oxygen acid ions, $PO_4^{3-}$, $(HPO_4)^{2-}$, $(H_2PO_4)^-$, $(P_2O_7)^{4-}$, $(P_3O_{10})^{5-}$, or those expressed by the formulae $(P_nO_{3n})^{n-}$ or $[(PO_3)_n]^{n-}$ (n is an integer not less than 3), such as $(P_3O_9)^{3-}$, $(P_4O_{12})^{4-}$, $(P_6O_{18})^{6-}$ and the like, or phosphorus-containing oxygen acid ions to which a number of H radicals are added, such as $(H_2P_2O_7)^{2-}$ may be named; and as boron-containing oxygen acid ions, $BO_3^{3-}$, $(HBO_3)^{2-}$, $(H_2BO_3)-$, $[B_3O_3(OH)_4]^-$, $[B_5O_6(OH)_4]^-$, $[B_4O_5(OH)_4]^{2-}$ and the like may be named. In the hydrotalcite compound of the present invention, a part or all of the A anions is in the form of at least one of silicon-, phosphorus- or boron-containing polymerized oxygen acid ions, to achieve the objects of infrared absorption improvement and light transmission improvement in agricultural film containing the compound.

As specific starting materials of these silicon-, phosphorus- or boron-containing oxygen acid ions, sodium metasilicate, No. 1, 2 and 3 water glasses or amorphous $SiO_2$ as dissolved in an aqueous alkali metal hydroxide solutions may be named as examples of silicon-containing material, and as phosphorus-containing material, phosphoric acid or aqueous alkali metal solutions (inclusive of those containing hydrogen radical); and boric acid, sodium borate, sodium tetraborate and the like may be named as examples of boron-containing material.

B is at least a kind of anion other than the A, examples of which being inorganic acid ions such as chloride ion, bromide ion, iodide ion, nitrate ion, carbonate ion, sulphate ion, perchlorate ion, iron cyanide ion and organic acid ions such as formate ion, acetate ion and oxalate ion. Of those, at least one anion selected from sulphate ion, carbonate ion, chloride ion and nitrate ion is preferred, in particular, sulphate ion and carbonate ion being preferred. The optimum is sulphate ion which shows infrared absorption in the vicinity of 1100 $cm^{-1}$, and even its local presence can improve infrared absorption of the hydrotalcite compound.

When the hydrotalcite compound of the invention is used as an infrared absorbing agent, while its content of silicon-, phosphorus- or boron-containing oxygen acid ions should be substantial, an excessively high content may invite reduction in infrared absorption attributable to the base layers of primary hydrotalcite compound, or, when it is blended in agricultural film, may cause drop in the latter's light transmission. Whereas, when the content is too low, the compound comes to exhibit poor infrared absorption and hence cannot improve heat insulation property of the agricultural film in which it is blended. Thus, preferably A anions occupy 20–90%, in particular, 30–80%, of theoretical amount (total electric charge number: $x^-$) of interlayer anions as calculated from the base layers in formula (1) or (2) in claim 1.

While preferred content of silicon-, phosphorus-, and boron-containing oxygen acid ions is as addressed in the above paragraph, in practice it is known that silicon-, phosphorus- or boron-containing oxygen acid ions have various forms, and it is difficult to determine the forms of the silicon-, phosphorus- or boron-containing oxygen acid ions present in interlayer of the hydrotalcite compound locally containing those interlayer anions. Consequently, it is also difficult to limit the electric charges of the oxygen acid ions. Still more difficult is to determine the ratio of the electric charge of the oxygen acid ions to the total electric charge number of the interlayer anions. We looked for an alternative means for determining it to find that it can be conveniently expressed by the ratio of electric charge numbers of the anions other than A, i.e., of the B anions which are present in the interlayer. Expressed in this way, it is preferred for the total electric charge number of B anions to amount to 10–80% of the total electric charge number of interlayer anions, i.e., $0.1 \leq$(total electric charge number of $(B)z_1)/x \leq 0.8$, in particular, 20–70%, i.e., $0.2 \leq$(total electric charge number of$(B)z_1)/x \leq 0.7$.

The hydrotalcite compound of the invention may be removed of a part or whole of its interlayer water, by heating its powder at temperatures of 150–250° C. for 1–20 hours.

The hydrotalcite compound holding A anions and B anions as the interlayer anions according to the invention can be distinguished from conventional hydrotalcite compounds by such means as powder X-ray diffraction (XRD), composition analysis or infrared absorption spectrum analysis.

Upon examining formation of hydrotalcite compound or spacing of the layers through the diffraction patterns obtained by XRD, presence of silicon-, phosphorus- and boron-containing polymerized oxygen acid ions held in the interlayer can be confirmed. For example, spacing of carbonate ion-, chloride ion-, or silicon-containing monomeric oxygen acid ion-type hydrotalcite compound as determined by XRD is 7.4–7.8 Å at (003) or (002) plane; and that of sulphate ion-, nitrate ion- or phosphorus-containing monomeric oxygen acid ion-type hydrotalcite compound, 8.2–8.8 Å at (003) or (002) plane. When those ions in these hydrotalcite compounds are exchanged with, e.g., silicon-, phosphorus- and boron-containing polymerized oxygen acid ions, the spacing at (003) or (002) plane in most cases increases to 9 Å or more. Whereby it is possible to predict whether or not such polymerized oxygen acid ions are present in the interlayer. This statement may not apply, however, when the content of silicon-, phosphorus- and boron-containing polymerized oxygen acid ions is little or when the interlayer water is removed by a heat treatment.

When a composition analysis is conducted, the molar ratio in the base layers and total electric charge number of interlayer anions can be determined from analyzing metal cations in the basic layers; and from analyzing B anions, total electric charge number of B anions can be determined; and it becomes possible to predict presence or absence of polymerized oxygen acid ions in the silicon-, phosphorus- or boron-containing oxygen acid ions, based on the difference in the measured electric charge numbers and the result of analysing silicon, phosphorus or boron.

According to infrared absorption spectrum analysis, when Si—O—Si linkage or P—O—P linkage are linearly present in the interlayer silicon- or phosphorus-containing polymerized oxygen acid ions, absorption is detected in the spectrum at around 1250–1280 cm$^{-1}$.

Thus, by synthetically considering these analyses results, hydrotalcite compound of the present invention is distinguishable from conventional hydrotalcite compounds.

While the hydrotalcite compound of the invention exhibits good dispersibility when it is blended with resin as it is, it may be surface-treated with at least one surface-treating agent of the group consisting of higher fatty acids; anionic surfactants; phosphoric acid esters; silane-, titanate- and aluminum-containing coupling agents; and fatty acid esters of polyhydric alcohols.

Specific examples of preferred surface-treating agents are as follows: higher fatty acids such as stearic acid, oleic acid, erucic acid, palmitic acid and lauric acid and alkali metal salts of these higher fatty acids; anionic surfactants such as sulfate esters of higher alcohols, eg., stearyl alcohol and oleyl alcohol, sulfate ester salts of polyethylene glycol ethers, amide bond sulfate ester salts, ether bond sulfonate salts, ester bond sulfonates, amide bond alkylallylsulfonate salts and ether bond alkylallylsulfonate salts; phosphoric acid esters such as acid or alkali metal salts or amine salts, which are mono- or diesters between orthophosphoric acid and oleyl alcohol, stearyl alcohol or the like, or mixtures of these esters; silane coupling agents such as vinylethoxysilane, γ-methacryloxypropyltrimethoxysilane vinyl-tris(2-methoxyethoxy)silane and γ-aminopropyltrimethoxysilane; titanate coupling agents such as isopropyl triisostearoyl titanate, isopropyl tris(dioctylpyrophosphate) titanate and isopropyl tridecylbenzenesulfonyl titanate; and aluminum coupling agents such as acetalkoxyaluminum diisopropylate, etc.

As methods of the surface treatment, there are wet method and dry method. In the wet method, a surface-treating agent as named above in liquid or emulsion state is added to slurry of the hydrotalcite compound of the invention, and sufficiently mixed under stirring at a temperature up to about 100° C. In the dry method, powder of the hydrotalcite compound of the invention is put in a mixer such as a Henschel mixer, to which the surface-treating agent in liquid, emulsion or solid state is added and sufficiently mixed with or without heating. Preferably, the surface-treating agent is used in an amount of about 0.1 to about 15% by weight of the hydrotalcite compound.

For use as an infrared absorbing agent either as it is or as surface-treated, the hydrotalcite compound of the invention preferably has an average secondary particle diameter as measured by laser diffraction scattering method of not more than 5 μm and a BET specific surface area of 30 m$^2$/g or less, in consideration of mechanical processability or dispersibility in resin. Also in terms of average primary particle diameter as observed with electron microscope, that of the hydrotalcite compound is preferably not more than 1 μm, in particular, not more than 0.5 μm, inter alia, not more than 0.3 μm. Preferred configuration of the particles is platy (including hexagonal platy form). Higher aspect ratio (average diameter of platy plane/average thickness) is preferred.

As examples of thermoplastic resins which are used for agricultural film according to the invention, polyolefin resins, chlorine-containing resins, polyester resins, acrylic resins and fluorine-containing resins can be named. Specific examples of the polyolefin resins include homopolymers of α-olefins such as low-density, high-density or straight chain polyethylene and polypropylene; α-olefin copolymers such as ethylene-propylene copolymers, ethylene-butene-1 copolymers, ethylene-4-methyl-1-pentene copolymers, ethylene-hexene copolymers and ethylene-octene copolymers; and copolymers of α-olefins with monomers other than α-olefins, whose main component is the α-olefins, such as ethylene-vinyl acetate copolymers, ethylene-acrylic acid copolymers, ethylene-methyl methacrylate copolymers, ethylene-vinyl acetate-methyl methacrylate copolymers and ionomer resins. As the catalyst to be used in synthesizing these polyolefinic resins, for example, Ziegler-Natta-type catalyst, Cr-containing catalyst and single'site (metallocene) type catalyst may be named. Their synthesis method is not critical, but any of solution methods or vapor phase methods under high pressure, reduced pressure or normal pressure may be used. Examples of chlorine-containing resins include polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-styrene copolymers, vinyl chloride-isobutylene copolymers, vinyl chloride-butadiene copolymers, vinyl chloride-isoprene copolymers, vinyl chloride-chlorinated propylene copolymers, vinyl chloride-maleate copolymers, vinyl chloride-methacrylate copolymers, vinyl chloride-acrylonitrile copolymers, vinyl chloride-styrene-maleic anhydride copolymers, vinyl chloride-styrene-acrylonitrile copolymers, vinyl chloride-vinylidene chloride-vinyl acetate copolymers and vinyl chloride-various vinyl ether copolymers. Examples of polyester resins include polyethylene terephthalate, polybutylene terephthalate, polybutylene naphthalate and polyether polyesters; and those of fluorine-containing resins include polytetrafluoroethylene and the like. Those resins can be used either singly or as a mixture of two or more of them.

The agricultural film according to the present invention may contain various additives customary in this technology. Examples of such additives include light stabilizer, antihazing agent, antifogging agent, antioxidant, ultraviolet absorber, plasticizing agent, antistatic agent, lubricant, heat stabilizer, fluorescent agent, antiblocking agent, pigment, dyestuff, antibacterial agent, antimolding agent, parting agent, plate out-preventing agent-and processing aids. They may be concurrently used with other infrared absorbing agent. By the concurrent use of these various additives, agricultural film excelling in weatherability, anti-haze property, antifogging property, dust resistance, water repellence, toughness, resistance to agricultural chemicals and to acid precipitation, heat resistance, antibleaching property, antibacterial and antifungicidal properties, stretching processability and resistance to degradation of the resins caused by various additives, as well as in durability of those favorable properties is obtained.

As the light stabilizers, for example, hindered amine compounds, cresols, melamines and benzoic acid may be named, hindered amine compounds being frequently used in general. More specifically, 2,2,6,6-tetraalkylpiperidine derivatives having a molecular weight not less than 250 and a substituent on 4-position are preferably used, examples of said 4-substituent including carboxylic acid groups, alkoxy groups and alkylamino groups. Their N-position may be substituted with an alkyl group. As specific examples of such hindered amine compounds, compounds of following formulae (a)–(t) and hindered amine-containing stabilizers such as Ciba Geigy's TINUVIN 492 and 494 may be named.

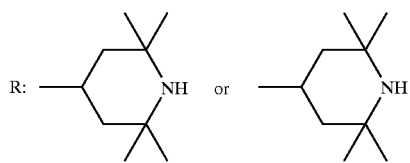
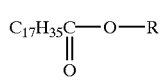 (a)
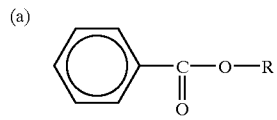 (b)
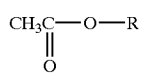 (c)
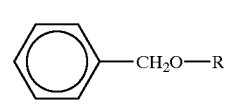 (d)
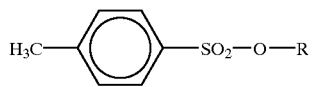 (e)
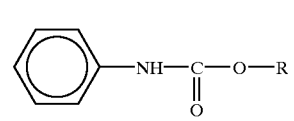 (f)
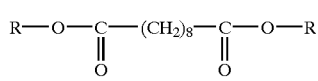 (g)
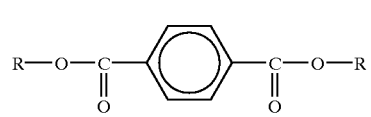 (h)
 (i)
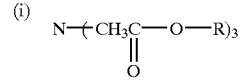 (j)
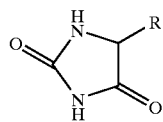 (k)
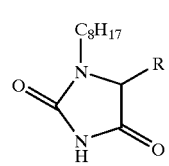 (l)
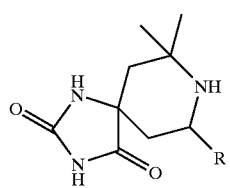 (m)
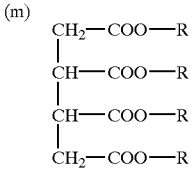 (n)
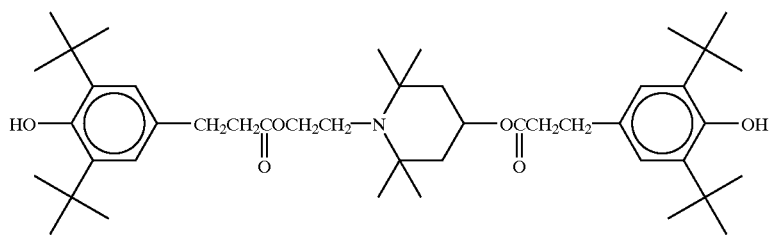 (o)
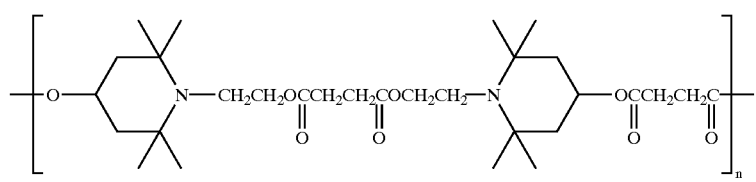 (p)

-continued

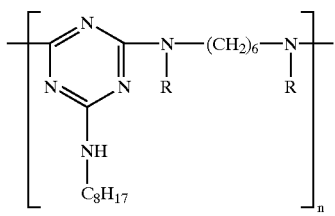 (q)

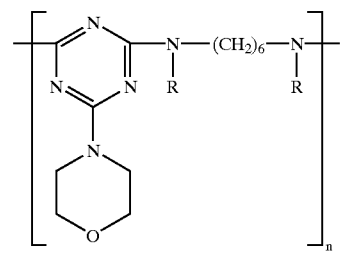 (r)

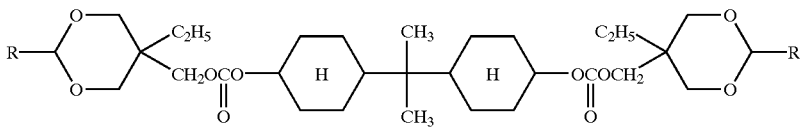 (s)

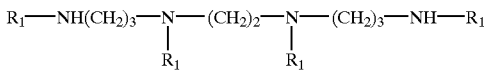 (t)

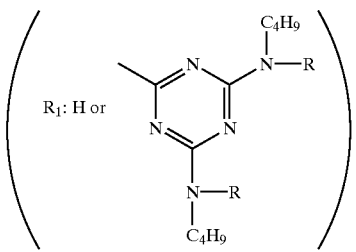

Such light stabilizers as above may be used singly or in combination of more than one, the amount of use being 0.02–5% by weight, preferably 0.1–2% by weight, to the thermoplastic resin.

As antihazing agent, nonionic, anionic or cationic surfactants may be used, examples of which including polyoxyalkylene ethers, esters or partial esters of polyhydric alcohols, esters or partial esters of alkylene oxide adducts of polyhydric alcohols, higher alcohol sulfuric acid ester alkali metal salts, alkylarylsulfonates, quaternary ammonium salts and aliphatic amine derivatives. Specifically, polyoxyethylene laurate, polyoxyethylene stearyl ether, polyoxyethylene nonyl phenyl ether, polyethylene glycol monopalmitate, polyethylene glycol monostearate, polyoxyethylene sorbitan monolaurate, polyoxyethylene sorbitan monopalmitate; esters or partial esters of polyhydric alcohols such as glycerine, pentaerythritol, sorbitol, diglycerine and triglycerine with aliphatic carboxylic acids such as lauric acid, palmitic acid, stearic acid and oleic acid; sodium lauryl sulfate, sodium dodecylbenzenesulfonate, sodium butylnaphthalenesulfonate, cetyltrimethylammonium chloride, alkyldimethylbenzylammonium chloride, dodecylamine hydrochloride, lauric acid laurylamidoethyl phosphate, triethylcetylammonium iodide, oleylaminodiethyl aminate and basic pyridinium salt of dodecylpyridinium sulfate may be named.

Use rate of such antihazing agent is 0.2–5% by weight, preferably 0.5–3% by weight, to the thermoplastic resin. Those antihazing agents as named above can be used either singly or in combination of two or more.

As antifogging agent, for example, fluorine compounds containing perfluoroalkyl groups or ω-hydrofluoroalkyl groups (fluorine-containing surfactants) and silicon compounds having alkylsiloxane groups (silicon-containing surfactants) may be used.

Use rate of such antifogging agent is 0.01–5% by weight, preferably 0.02–2% by weight, to the thermoplastic resin. Those antifogging agents as named above can be used either singly or in combination of two or more.

As antioxidant, phenol-, phosphorus-, sulfur- or hydroxyamine-containing antioxidants can be used. Those piperidine-containing compounds as named among the useful light stabilizers can also be used. Specific examples of phenolic antioxidants include phenols such as 2,6-di-tert-butyl-p-cresol, stearyl-(3,5-dimethyl-4-hydroxybenzyl) thioglycolate, stearyl-β-(4-hydroxy-3,5-di-tert-butylphenyl) propionate, distearyl-3,5-di-tert-butyl-4-hydroxybenzylphosfonate, 2,4,6-tris(3',5'-di-tert-butyl-4'-hydroxybenzylthio)-1,3,5-triazine, distearyl(4-hydroxy-3-methyl-5-tert-butyl)benzylmalonate, 2,2'-methylenebis(4-methyl-6-tert-butylphenol), 4,4'-methylenebis-(2,6-di-tert-butylphenol), 2,2'-methylenebis[6-(1-methylcyclohexyl)-p-cresol], bis[3,5-bis(4-hydroxy-3-tert-butylphenyl)butyric acid] glycol ester, 4,4'-butylidenebis(6-tert-butyl-m-cresol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl) phenyl]terephthalate, 1,3,5-tris(2,6-dimethyl-3-hydroxy-4-tert-butyl)benzylisocyanurate, 1,3,5-tris(3,5-di-tert-butyl-4-hydroxybenzyl)-2,4,6-trimethylbenzene, 2,6-diphenyl-4-octadecyloxyphenol tetraquis[methylene-3-(3,5-di-tert-butyl-4-hydroxyphenyl)propionate]methane, 1,3,5-tris-(3,5-di-tert-butyl-4-hydroxybenzyl)isocyanurate, 1,3,5-tris[(3,5-di-tert-butyl-4-hydroxyphenyl)-propionyloxyethyl] isocyanurate, 2-octyl-4,6-di(4-hydroxy-3,5-di-tert-butyl) phenoxy-1,3,5-triazine and 4,4'-thiobis(6-tert-butyl-m-cresol; and polyhydric phenol-carbonic acid oligoesters such as carbonic acid oligoesters of 4,4'-butylidenebis(2-tert-butyl-5-methylphenol) (eg., those of polymerization degrees of 2, 3, 4, 5, 6, 7, 8, 9 and 10).

Specific examples of phosphorus-containing antioxidants include triaryl phosphites such as triphenyl phosphite, tris (nonylphenyl)phosphite, tris(p-nonylphenyl)phosphite, tris (p-phenylphenyl)phosphite, tris(o-dicyclohexylphenyl) phosphite, tri(mononony/di-nonylphenyl)phosphite, phenyl-p-nonylphenyl phosphite, tris(2,4-di-tert-butylphenyl)phosphite and tris[2-tert-butyl-4-(3-tert-butyl-4-hydroxy-5-methylphenylthio)5-methylphenyl]phosphite; alkylaryl phosphites such as mono-octyldiphenylphosphite, di-octylmonophenylphosphite, di-decylmonophenylphosphite and monodecyl-phenylphenylphosphite; trialkyl phosphites such as tributyl phosphite, trioctyl phosphite, tridecyl phosphite, trilauryl phosphite and trioleyl phosphite; and organophosphoric acid-type or organophosphoric acid metal salt-type compounds which are compounds of organophosphoric acid metal salts containing alkyl, aryl, alkylaryl groups or ether linkages, such as di(tridecyl)-pentaerythritol diphosphite, distearyl-pentaerythritol diphosphite, di(nonylphenyl) pentaerythriol diphosphite, bis(2,4-di-tert-butylphenyl) pentaerythritol diphosphite, bis(2,6-di-tert-butyl-4-methylphenyl)pentaerythritol diphosphite, tetra(tridecyl) isopropylidenediphenol diphosphite, hexa(tridecyl)-1,1,3-tris(2-methyl-4-hydroxy-5-tert-butylphenyl)butane triphosphite, tetraquis(2,4-di-tert-butylphenyl)biphenylene diphosphonite and 2,2'-methylenebis(4,6-di-tert-butylphenyl) (octyl)phosphite.

Examples of sulfur-containing antioxidants include dialkyl (such as dilauryl-, distearly)thiodipropionates and esters of alkylthiopropionic acids (such as butyl-, octyl-, lauryl- and stearyl-) with polyhydric alcohols (such as glycerine, trimethylolethane, trimethylolpropane, pentaerythritol, trishydroxyethyl isocyanurate). As specific examples, dilaurylthiodipropionate, distearylthiodipropionate and pentaerythritol tetralaurylthiopropionate may be named.

The use rate of such antioxidant is 0.01–5% by weight, preferably 0.02–3% by weight, to the thermoplastic resin. These antioxidants can be used either singly or in combination of more than one.

Ultraviolet absorbing agents may be benzotriazole-, benzophenone- or salicylate-type. Specific examples of benzotriazole ultraviolet absorbers include 2-(2'-hydroxy-5'-methylphenyl)benzotriazole, 2-(2'-hydroxy-5'-tert-butylphenyl)benzotriazole, 2-(2'-hydroxy-3',5'-dimethylphenyl)benzotriazole, 2-(2'-methyl-4'-hydroxyphenyl)benzotriazole, 2-(2'-hydroxy-3'-methyl-5'-tert-butylpheny)benzotriazole, (2'-hydroxy-3',5'-di-tert-amylphenyl)benzotriazole, (2'-hydroxy-3',5'-di-tert-butylphenyl)benzotriazole, 2-(2'-hydroxy-3',5'-dimethylphenyl-5-methoxybenzotriazole, 2-(2'-n-octadecyloxy-3',5'-dimethylphenyl)-5-methylbenzotriazole, 2-(2'-hydroxy-5'-methoxyphenyl)benzotriazole, 2-(2'-bydroxy-4'-octoxyphenyl)benzotriazole, 2-(2'-hydorxy-5'-methoxyphenyl)-5-methylbenzotriazole, 2-(2'-hydroxy-5'-methoxyphenyl)-5,6-dichlorobenzotriazole, 2-(2'-hydroxy-5'-tert-butylphenyl)-5-chlorobenzotriazole, 2-(2'-hydroxy-3',5'-di-tert-butylphenyl)-5-chlorobenzotriazole, 2-(2'-hydroxy-5'-phenylphenyl)-5-chlorobenzotriazole, 2-(2'-hydroxy-5'-dichlorohexylphenyl)benzotriazole, 2-(2'-hydroxy-4',5'-dichlorophenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-methylphenyl)-5-butoxycarbonylbenzotriazole, 2-(2'-hydroxy-4',5'-dimethylphenyl)-5-butoxycarbonylbenzotriazole, 2-(2'-hydroxy)-5-ethoxycarbonylbenzotriazole, 2-(2'-acetoxy-5'-methylphenyl)benzotriazole, 2-(2'-hydroxy-5'-methylphenyl)-5-ethylsulfobenzotriazole, 2-(2'-hydroxy-3', 5'-dimethylphenyl)-5-ethylsulfonbenzotriazole, 2-(2'-hydroxy-5'-phenylphenyl)benzotriazole and 2-(2'-hydroxy-5'-aminophenyl)benzotriazole.

Specific examples of benzophenone ultraviolet absorbers include 2-hydroxy-4-methoxybenzophenone, 2-hydroxy-4-n-octyloxybenzophenone, 2-hydroxy-4-octoxybenzophenone, 2-bydroxy- 4-n-dodecyloxybenzophenone, 2-hydroxy-4-n-octadecyloxybenzophenone, 2-hydroxy-4-benzyloxybenzophenone, 2-hydroxy-4-methoxy-2'-carboxybenzophenone, 2-hydroxy-4-methoxy-5-sulfobenzophenone, 2-hydroxy-5-chlorobenzophenone, 2,4-dihydroxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone and 2,2',4,4'-tetrahydroxybenzophenone.

Specific examples of salicylate ultraviolet absorbers include phenyl salicylate, p-tert-butylphenyl salicylate, p-methylphenyl salicylate and p-octylphenyl salicylate.

Besides the foregoing, triazine-type 2-(4,6-diphenyl-1,3, 5-triazin-2-yl)-5-[(hexyl)oxy]phenol or oxalic anilide type 2-ethoxy-2'-ethyl-oxalic bisanilide may also be named.

The use rate of such ultraviolet absorbers is 0.01–3% by weight, preferably 0.05–2% by weight, to the thermoplastic resin. The absorbers can be used either singly or in combination of two or more.

As plasticizers, those routinely used for plasticizing polyvinyl chloride or olefin-vinyl alcohol copolymers can be used. For example, low molecular weight polyhydric alcohols, phthalic acid Aesters, phosphoric acid esters, aliphatic-basic acid esters, epoxy compounds and paraffins can be used.

Specific examples of the low molecular weight polyhydric alcohols include glycerine, ethylene glycol, triethylene glycol and sorbitol.

Specific examples of phthalic acid ester plasticizers include dimethyl phthalate, dibutyl phthalate, dioctyl phthalate, diisodecyl phthalate, heptyl phthalate, di-2-ethylhexyl phthalate, butylbenzyl phthalate, butyllauryl phthalate and methyloleyl phthalate.

Specific examples of phosphoric acid ester plasticizers include tricresyl phosphate, trixylenyl phosphate, dixylenyl monocresyl phosphate, monoxylenyl cresyl phosphate, tributyl phosphate, triphenyl phosphate and tri-2-ethylhexyl phosphate.

Specific examples of aliphatic-basic acid ester plasticizers include butyl oleate, glycerine monooleate, butyl stearate, diisodecyl adipate, dibutyl adipate, dioctyl adipate, isodecyl adipate, dioctyl azelate, di-2-ethylhexyl adipate and methyl acetyl ricinoleate.

Specific examples of the epoxy compounds are similar to those exemplified as epoxy heat stabilizers later.

Specific examples of paraffinic plasticizers include chlorinated paraffins, butylchlorinated paraffins and liquid paraffin.

Use rate of such plasticizers as above ranges 1–70% by weight, preferably 2–60% by weight, to the thermoplastic resin. They can be used either singly or in combination of two or more.

As useful antistatic agents, nonionic or cationic surfactants may be named. Specific examples include polyethylene oxide, carbowax, pentaerythritol monostearate, sorbitol monopalmitate, polyoxyethylene alkylamine, polyglycol ether and sodium p-styrene-sulfonate.

Such antistatic agents are added in an amount of 0.01–5% by weight, preferably 0.02–3% by weight, to the thermoplastic resin. They can be used either singly or in combination of two or more.

As useful lubricants, aliphatic acid-, aliphatic acid amide- and ester-type lubricants, waxes and paraffins can be named. Specific examples include stearic acid, palmitic acid, myristic acid, stearic acid amide, palmitic acid amide, erucicacid amide, methylenebis-stearamide, ethylenebis-stearamide, butyl stearate, butyl palmitate, polyethylene wax and liquid paraffin.

Use rate of such lubricants ranges 0.01–5% by weight, preferably 0.05–3% by weight, to the thermoplastic resin. They can be used either singly or in combination of two or more.

As heat stabilizers, inorganic, organic acid metal salt-, organic acid complex metal salt-, organotin-, epoxy compound-, polyol-, sulfur-, organic antimony-, phosphite-, β-diketone-type and nitrogen-containing heat stabilizers can be used.

Specific examples of inorganic heat stabilizers include oxides, hydroxides, carbonates, sulfates, phophates, phosphites and silicates of such metals as Li, Na, K, Mg, Ca, Sr, Ba, Pb, Zn, Cd, Zr, Al, Sn, Sb and Bi; and salts of these metals with halogenated oxyacids such as perchloric acid, periodic acid, chloric acid, bromic acid, Iodic acid, chlorous acid, hypochlorous acid and bromous acid.

As organic metal salt-type heat stabilizers, acidic, neutral or basic salts of above-named metals with the below-exemplified organic acids can be named: aliphatic carboxylic acids such as 2-ethylhexonic acid, lauric acids, myristic acid, palmitic acid, stearic acid, hydroxystearic acid, linoleic acid, behenic acid, isostearic acid, oleic acid, ricinoleic acid, caproic acid, heptanoic acid, n- or iso-octylic acid, pelargonic acid, capric acid, isodecanoic acid, undecylic acid, neotridecanoic acid, acetoacetic acid and acetic acid; dibasic acids such as maleic acid, thiodipropionic acid and dithiopropionic acid; partially esterified products of those dibasic acids with substituted or unsubstituted aliphatic, alicyclic or aromatic alcohols; and cyclic organic acids such as benzoic acid, methylbenzoic acid, butylbenzoic acid, para-t-butylbenzoic acid, phenylacetic acid, salicylic acid, fumaric acid, naphthoic acid, abietic acid, phenylstearic acid, hydrinecarboxylic acid, cinnamic acid, rhodinic acid and haphthenic acid.

Specific examples of organic complex metal salt-type heat stabilizers include Ca/Zn, Ba/Cd, Ba/Zn and Ba/Cd/Zn salt systems of above organic acids.

Specific examples of organotin-type heat stabilizers include mono(or di)methyl- or butyl- or octyl-tin-tri-(or di)laurate, mono(or di)methyl- or butyl- or octyl-tin maleate polymer, mono(or di)methyl-, or butyl- or octyl-tin-tris(or bis)isooctyl maleate, mono(or di)methyl- or butyl- or octyl-tin thioglycolate, mono(or di)methyl or butyl or octyl-tin-2-mercaptopropionate, mono(or di)methyl or butyl- or octyl-tin-tri(or di)dodecylmercaptide, mono(or di)methyl- or butyl- or octyl-tin sulfide, mono(or di)methyl- or butyl- o r octyl-tin-thioglycolate, mono(or di)methyl- or butyl- or octyl-tin-tris(or bis)2-mercaptoethyl oleate, thiobis(monomethyltin-bis-2-mercaptoethyl oleate) and thiobis(dimethyl- or butyl- or octyl-tin-mono-2-mercaptoethyl oleate).

Specific examples of epoxy compound-type heat stabilizers include epoxylated soybean oil, diacetomonoglycelide thereof, epoxylated linseed oil, epoxylated linseed oil fatty acid butyl, epoxylated 1,2-polybutadiene, bisphenol-A-diglycidyl ether, 3,4-epoxycyclohexylmethyl, 3,4-epoxycyclohexanecarboxylate, epoxylated tallow oil, epoxylated cottonseed oil, epoxylated sunflower oil, epoxylated tall oil, epoxylated fish oil, epoxylated acetomonoolefin, epoxylated stearic acid methyl-, -butyl, -isooctyl, -2-ethylhexyl, -isodecyl, -cyclohexyl, -dihydrononyl, -methyoxyethyl, -acetoxyethyl, -benzoyl, -tetrahydrofuryl, -phenyl or -p-tert-butylphenyl, epoxylated tall oil fatty acidbutyl, -n-octyl, -isooctyl or -2-ethylhexyl, epoxytriacetomonoricinoleic acid glyceride, 9,10-epoxystearic acid ester of 3,4-epoxycyclohexylmethanol, 9,10,12,13-diepoxystearic acid ester of 3,4-epokycyclohexylmethanol, 2-ethyl-1,3-hexanediol ester of 3,4-epoxycyclohexylcarboxylic acid, dialkyl (eg., di-n-butyl, di-n-hexyl, di-2-ethylhexyl, diisooctyl, di-n-decyl, diisodecyl, di-n-butyldecyl and the like) esters of epoxyhexahydrophthalic acid, 3,4-epoxy-6-methylcyclohexyl carboxylate, bis(3,4-epoxy-6-methylcyclohexylmethyl) adipate and condensation product of epihalohydrin and bisphenol A.

Specific examples of polyol-type heat stabilizers include pentaerythritol, mannitol, xylitol, sorbitol, glycerine, trimethylolpropane, polyethylene glycol, polyvinyl alcohol, 1,3-butanediol, propylene glycol, dipropylene glycol, ethylene glycol, diethylene glycol, neopentyl glycol, triethylolmethane, diglycerine, di-trimethylolpropane, di-tri-methylol ethane, di-, tri- or tetra-pentaerythritol, tris (hydroxyethyl)isocyanurate; and partial esters of these polyols with such organic acids as aliphatic carboxylic acids, aromatic carboxylic acids, amino acids and oxyacids. Specific examples of the organic acids which form the partial esters include monovalent aliphatic carboxylic acids such as octylic acid, lauric acid, myristic acid, palmitic acid, stearic acid, isostearic acid, hydroxystearic acid, oleic acid and ricinoleic acid; divalent aliphatic carboxylic acids such as malonic acid, succinic acid, glutaric acid, adipic acid, pimelic acid, suberic acid, azelaic acid, sebacic acid, phthalic acid, maleic acid, fumaric acid, itaconic acid, thiodipropionic acid and dithiopropionic acid; aromatic carboxylic acids such as benzoic acid, methylbenzoic acid and salicylic acid; amino acids such as glycine, alanine, leucine, phenylalanine, methionine, aspartic acid, glutamic acid and lysine; and oxy acids such as lactic acid, citric acid, tartaric acid and malic acid.

Specific examples of sulfur-type heat stabilizers include thiodipropionic acid esters such as dilaurylthiodipropionate, distearylthiodipropionate and laurylstearylthiodipropionate; triazinethiols such as 6-enilino-1,3,5-triazine-2,4-dithiol; and thiolcarboxylic anhydride such as thiollauric anhydride.

Specific examples of organic antimony-type heat stabilizers include mono(or di)alkylantimony laurates such as mono(or di)methyl-, butyl- or octyl-antimony tri(or di)laurate; mono(or di)alkyl antimony maleates such as mono(or di)methyl-, butyl- or octyl-antimony maleate polymers and mono(or di)methyl-, butyl- or octylantimony tris (or bis)isooctyl maleate; and mono(or di)alkylantimony mercaptides such as mono(or di)methyl-, butyl- or octyl-antimonytris(or bis)isooctylthioglycolate, mono(or di)methyl-, butyl- or octylantimony-tri(or bis)thioglycolate (or 2-mercaptopropionate), mono(or di)methyl-, butyl- or octyl-antimony-tri(or di)dodecylmercaptide, mono(or di)methylantimony sulfide, dioctylantimony sulfide, didodecylantirmony sulfide, mono(or di)methyl-, butyl- or octylantimony-tris(or bis)-2-mercaptoethyl oleate, thiobis [monomethylantimony-bis(2-mercaptoethyl oleate)] and thiobis[dimethyl-, butyl- or octyl-antimony-bis(2-mercaptoethyl oleate)].

As phosphite-type heat stabilizers, those exemplified as phosphorus antioxidants can be used.

Specific examples of β-diketone heat stabilizers include ethyl acetoacetate, dehydroacetic acid, acetylacetone, benzoylacetone, benzoylpropionylmethane, dibenzoylmethane, stearoylbenzoylmethane, trifluoroacetylacetone, dehydropropionylacetic acid, dehydrobenzoylacetic acid, cyclohexane-1,3-dione, dimethone, 2,2-methylenecyclohexan-1,3-dione, 2-benzylcyclohexan-1,3-dione, acetyltetralone, palmitoyltetralone, stearoyltetralone, benzoyltatralone, 2-acetylcyclohexanone, 2-benzoylcyclohexanone, 2-acetylcyclohexan-1,3-dione, benzoyl-p-chlorobenzoylmethane, bis(4-methylbenzoyl) methane, bis(2-hydroxybenzoyl)methane, benzoylacetylmethane, tribenzoylmethane, diacetylbenzoylmethane, palimitoylbenzoylmethane, lauroylbenzoylmethane, 4-methoxybenzoylbenzoylmethane, bis(4-methoxybenzoyl) methane, bis(4-chlorobenzoyl)methane, bis(3,4-methylenedioxybenzoyl)methane, benzoylacetyloctylmethane, benzoylacetylphenylmethane, stearoyl-4-methoxybenzoylmethane, bis(4-tert-butylbenzoyl)methane, benzoylacetylethylmethane, benzoyltrifluoroacetylmethane, diacetylmethane, butanoylacetylmethane, heptanoylacetylmethane, triacetylmethane, distearoylmethane, stearoylacetylmethane, palmitoylacetylmethane, lauroylacetylmethane, benzoylformylmethane, acetylformylmethane, benzoylphenylacetylmethane, bis(cyclohexanoyl)methane and dipivaloylmethane; and metal salts of these compounds with such metals as Li, Na, Mg, Ca, Ba, Sr, Zn, Al, Zr and Sn.

Specific example of nitrogen-containing heat stabilizers include diphenylthiourea; P-aminocrotonic acid esters of such alcohols as stearyl alcohol, cetyl alcohol, 1,3-butanediol and thiodiethylene glycol; and 2-phenylindole and dihydro-1,4-dimethyl-2,6-dicarbodidecyloxy-3,5-pyridine.

Use rate of those heat stabilizers ranges 0.001–10% by weight, preferably 0.005–5% by weight, to the thermoplastic resin. They can be used either singly or in combination of two or more.

Flourescent agents may also be added to the agricultural film of the present invention.

As the fluorescent agents, those of violanthrone, isoviolanthrone, perylene, thioxanthene, coumarin, anthraquinone, benzopyran, naphthalimide, or naphthalic acid, benzopiperidine, pyrazine, cyanopyrazine, stilbene, diaminodiphenyl, imidazole, imidazolone, triazole, thiazole, oxazole, carbostyril, pyrazoline and dihydropyridine compounds can be named.

Use rate of such flourescent agents ranges 0.001–10% by weight, preferably 0.01–5% by weight, to the thermoplastic resin. They can be used either singly or in combination of two or more.

Finally, as examples of other infrared absorbing agents, silica and silicate; hydroxide, oxide, aluminate, borate and sulfate of lithium, calcium, magnesium and aluminium; and conventional hydrotalicite compounds may be named. They can be used either singly or in combination of two or more. Whereas, because the hydrotalcite compound of the present invention holding the A anions and B anions exhibits excellent infrared absorbing ability and is capable of imparting excellent light transmission to an agricultural film which contains said compound, it is preferably used as an infrared absorbing agent by itself. Suitable amount of an infrared absorbing agent, in terms of either the hydrotalcite compound of the present invention alone or that in combination with other infrared absorbing agent or agents, is 1–30% by weight to, for example, the thermoplastic resin which constituents the object agricultural film. Where the amount is less than 1% by weight, its effect as infrared absorbing agent cannot be sufficiently exhibited, and when it exceeds 30% by weight, it impairs ultraviolet and visible light transmission as well as mechanical strength of the agricultural film.

When such problems as foaming or fish eye formation occur in the occasion of incorporating the hydrotalcite compound of the invention as an infrared absorbing agent into an agricultural film-forming thermoplastic resin, or in the occasion of film-molding, if necessary the hydrotalcite compound from which the interlayer water (water of crystallization) has been removed can be used.

The incorporation or kneading can be conducted according to the accepted practice. For example, the resin, infrared absorbing agent and other additives are mixed with, e.g., a Henschel mixer, super mixer, ribbon blender and the like, and then melted and kneaded in a Bumbury's mixer, kneading extruder, pressure kneader or the like. The kneaded product then can be formed into film by conventional molding methodes such as, for example, inflation molding or extrusion T-die film-molding method.

The agricultural film of the present invention can be either monolayered or multilayered. As the construction of the multilayered film, for example, single composition-2 layers, single composition-3 layers, 2 compositions-2 layers, 2 compositions-3 layers, 3 compositions-3 layers, 3 compositions-4 layers, 3 compositions-5 layers, 4 compositions-4 layers, 4 compositions-5 layers, 5 compositions-5 layers can be used. Kind of thermoplastic resin or resin blend may be different among individual layers. Of useful thermoplastic resins, it is desirable to select at least one resin which shows favorable absorption at the wavelength region of 2.5 μm–25 μm, because of good heat insulation. Again, additives for individual layers can be suitably selected according to the intended functions thereof, to formulate the optimum blend for each layer. It is also possible to form an antihazing film on at least the inner surface of the agricultural film which is to be stretched over agricultural greenhouses or the like for the purpose of maintaining antihazing performance of the film over many hours, besides the earlier described method of blending an antihazing agent in the film.

Hereinafter the present invention is further explained referring to Examples and Comparative Examples, it being understood that the invention is not thereby limited.

Each hydrotalcite compound made in Examples or Comparative Examples was first identified by means of X-ray diffractiometry (XRD). Then molar ratios in its base layers (x, $y_1$ and $y_2$) were calculated based on analysis of metal cations by composition analysis method, and the molar ratio ($z_2$) of B anions to the base layers, based on analysis of the B anions. The ratio of total electric charge number of B anions in the total electric charge number (x) which is determined depending on the base layers is calculated by substituting the so determined values for $z_2$ and x in the formula (total electric charge number of $(B)z2)/x$). As to the silicon-, phosphorus- and boron-containing oxygen acid ions which are A anions, whether or not those A anions held at interlayer contain silicon-, phosphorus- and boron-containing polymerized oxygen acid ions is estimated, based on the starting materials which were used in the occasion of ion-exchange, analysis values of Si, P or B found upon the composition analysis, spacing at (002) or (003) planes determined by XRD, and. the result of infrared absorption spectrometry. It is difficult to judge in what form or forms such silicon-, phosphorus- and boron-containing oxygen acid ions are held in the interlayer. Furthermore, these oxygen acid ions include those containing single H radical or OH radical or plurality of those radicals and also polymerized oxygen acid ions differing in degree of polymerization, and it is difficult to specify their electric charges. In the following Examples, therefore, compositions of silicon-, phosphorus- and boron-containing oxygen acid ions are conveniently expressed as: (polymerized $Si_mO_{2m+1}$), (polymerized $P_mO_{(5m/2)+1}$) and (polymerized $B_mO_{(3m/2)+1}$), which are invariably assumed to have an electric charge of $2^-$ each in calculating the composition formulae. Furthermore, molar ratios of Si, P or B to Al are calculated by substituting the respective composition values in the formula (mol number of Si+P+B)/(mol number of $Al_2O_3$). Specific surface areas are given by the numerical values as determined by BET process from the adsorbed amounts of nitrogen gas. The average secondary particle diameters are the numerical values obtained by adding each powder to an organic solvent, subjecting the system to an ultrasonic dispersion and then measuring the particle diameters by laser diffractive scattering method.

In respect of those films containing the infrared absorbing agents as provided by Examples and Comparative Examples, dispersibility of the agents in the films, heat insulation index, total light transmission and haze value (degree of haziness) were measured. The dispersibility of each infrared absorbing agent in the respective film (formation of white blisters) was evaluated by visual observation.

The heat insulation indices were calculated by a method described later, from the measurements of infrared absorption at individual wavelengths using infrared absorption spectrum measuring device. Also light transmission was measured with hazemeter, and the result was expressed as total light transmission and haze value (degree of haziness).

The heat insulation index was calculated as follows. The black body radiation energy ($E\lambda \cdot d\lambda$) at each wavelength was determined by the equation (3) below, and the total black body radiation energy density, by integrating the black body radiation energy levels from 400 $cm^{-1}$ to 2,000 $cm^{-1}$ ($\Sigma E\lambda \cdot d\lambda$). Then infrared absorption of each film (containing an infrared absorbing agent) at each wavelength was measured with infrared absorption spectrum-measuring device, and by multiplying the black body radiation energy (EA dX) at each wavelength by the infrared absorption at the same wavelength and integrating the products, total absorption energy density of the film was determined. The ratio of the total black body radiation energy density to the total absorption energy density of the film [following equation (6)] is indicated as the heat insulation index.

$$E\lambda \cdot d\lambda = 2\pi hC^2 / [\lambda^5 \{e^{(hC/\lambda kT)} - 1\}] \cdot d\lambda \quad (3)$$

λ: wavelength
h: Planck's constant
C: velocity of light in vacuum
k: Boltzmann's constant
T: absolute temperature.

Heat insulation index=(total absorption energy density/total black body radiation energy density)×100 (6)

A higher heat insulation index as calculated from the above equation signifies greater infrared absorbability, i.e., higher heat insulation property. Also the closer the total light transmission to 100 as measured by hazemeter, the better the visible light transmission of the film, and the less the haze value (degree of haziness), the less the haziness in the film.

EXAMPLE 1

A liquid mixture of 2 liters of 1.5 mols/liter $MgCl_2$ solution and 0.667 liter of 1.0 mol/liter $Al_2(SO_4)_3$ solution was put in a stainless steel vessel, and into which 2.889 liters of 3.0 mols/liter NaOH solution was poured under stirring, followed by about 30, minutes' stirring. The resulting reaction slurry was transferred into an autoclave, subjected to a hydrothermal treatment at 170° C. for 6 hours, cooled, filtered and washed with water. Then the de-watered product was thrown into a stainless steel vessel containing 5 liters of ion-exchange water, once again converted to a slurry under stirring and heated to 90° C. Under continued stirring, 1.300 liters of 1.0 mol/liter (as $SiO_2$) sodium silicate (No. 3 water glass) solution was added, followed by further 2 hours' stirring. Finally the system was filtered, and the recovered solid was washed with water and dried at 95° C. for one day and night. So dried product was pulverized to provide the product sample.

Upon analysis, the composition of the product was:

$Mg_{0.692}Al_{0.308}(OH)_2$ (polymerized $Si_{4.84}O_{10.68})_{0.062}$ $(SO_4)_{0.062}(CO_3)_{0.030}$. $0.69H_2O$. The ratio of B anions to the total electric charge (x) was 0.60, the molar ratio of Si to $Al_2O_3$ was 1.95, the BET specific surface area of the powder was 23 $m^2/g$, and the average secondary particle diameter was 0.69 μm.

EXAMPLE 2

The procedures up to the sodium silicate treatment of Example 1 were repeated, followed by filtration and the recovered solid was washed with water and de-watered. The product was thrown into a stainless steel vessel containing 5 liters of ion-exchange water, re-slurried under stirring and heated to 80° C. Separately, 16.5 g of sodium stearate (purity: 86%) was weighed and dissolved in ion-exchange water at 80° C., and the. solution was poured into the slurry under stirring, to effect a surface treatment. Finally the system was filtered, washed with water, dried for a day and night at 95° C., and pulverized to provide the product sample.

Upon analysis, the composition of the product was identified to be:

$Mg_{0.692}Al_{0.308}(OH)_2$ (polymerized $Si_{4.84}O_{10.68})_{0.062}$ $(SO_4)_{0.062}(CO_3)_{0.030}$. $0.69H_2O$. The ratio of B anions in the total electric charge (x) was 0.60, the molar ratio of Si to $Al_2O_3$ was 1.95, the BET specific surface area of the powder was 18 $m^2/g$, average secondary particle diameter was 0.77 μm and the adsorption of the surface treating agent was 3.0% by weight.

EXAMPLE 3

The product of Example 2 was further heat-treated at 200° C. for 3 hours to be removed of its interlayer water.

Upon analysis, the composition of the product was identified to be:

$Mg_{0.062}Al_{0.308}(OH)_2$ (polymerized $Si_{4.84}O_{10.68})_{0.062}$ $(SO_4)_{0.062}(CO_3)_{0.030}$. $0.09H_2O$. The ratio of B anions in the total electric charge (x) was 0.60, the molar ratio of Si to $Al_2O_3$ was 1.95, the BET specific surface area of the powder was 20 $m^2/g$, average secondary particle diameter was 0.72 μm and the adsorption of the surface treating agent was 3.3% by weight.

EXAMPLE 4

Two liters of 1.5 mols/liter $MgCl_2$ solution and 0.750 liter of 1.0 mol/liter $Al_2(SO_4)_3$ solution were fed into a stainless steel vessel, and into which 3.000 liters of 3.0 mols/liter NaOH solution was poured, followed by about 30 minutes' stirring. Then the reaction slurry was transferred into an autoclave, given a hydrothermal treatment at 170° C. for 6 hours, cooled to not higher than 100° C. and transferred into a stainless steel vessel. Re-heating the slurry to 80° C., 1.125 liters of 1.0 mol/liter (as $SiO_2$) sodium silicate solution (No. 3 water glass) was added to the slurry under stirring, followed by an hour's stirring. Separately, 14 g of stearyl phosphate (purity: 99%) was weighed and suspended in diluted sodium hydroxide solution at 80° C. The suspension was poured into the slurry to effect a surface treatment. Finally the system wasp filtered, and the recovered solid was washed with water, dried for a day and night at 95° C., and pulverized to provide the product sample.

Upon analysis, the composition of the product was identified to be:

$Mg_{0.667}Al_{0.333}(OH)_2$ (polymerized $Si_{6.02}O_{13.04})_{0.0415}$ $(SO_4)_{0.095}(CO_3)_{0.030}$. $0.43H_2O$. The ratio of B anions in the total electric charge (x) was 0.75, the molar ratio of Si to $Al_2O_3$ was 1.50, the BET specific surface area of the powder was 15 $m^2/g$, average secondary particle diameter was 0.70 $\mu m$, and adsorption of the surface treating agent was 3.0% by weight.

EXAMPLE 5

The product of Example 4 was further heat-treated at 200° C. for 3 hours to be removed of the interlayer water.

Upon analysis, the composition of the product was identified to be:

$Mg_{0.667}Al_{0.333}(OH)_2$ (polymerized $Si_{6.02}O_{13.04})_{0.0415}$ $(SO_4)_{0.095}(CO_3)_{0.030}$. $0.08H_2O$. The ratio of B anions in the total electric charge (x) was 0.75, the molar ratio of Si to $Al_2O_3$ was 1.50, the BET specific surface area of the powder was 18 $m^2/g$, average secondary particle diameter was 0.68 $\mu m$ and the adsorption of the surface treating agent was 3.3% by weight.

EXAMPLE 6

Two liters of 1.5 mols/liter $MgCl_2$ solution and 0.698 liter of 1.0 mol/liter $Al_2(SO_4)_3$ solution were put in a stainless steel vessel, and into which 2.930 liters of 3.0 mols/liter NaOH solution was poured under stirring, followed by 30 minutes' stirring. The resulting reaction slurry was transferred into an autoclave, subjected to a hydrothermal treatment at 170° C. for 6 hours, cooled, filtered and washed with water. Then the de-watered product was thrown into a stainless steel vessel containing 5 liters of ion-exchange water and heated to 90° C. Then 1.605 liters of 1.0 mol/liter (as $SiO_2$) sodium silicate (No. 3 water glass) solution was added under stirring, and the stirring was continued for further 3 hours. Separately, 18.6 g of stearyl phosphate (purity: 99%) was weighed and suspended in diluted sodium hydroxide solution at 90° C. The suspension was poured into the slurry under stirring to effect a surface treatment. Finally the system was filtered, and the recovered solid was washed with water and dried for a day and night at 95° C., and pulverized to provide the product sample, which was further heat-treated at 200° C. for 3 hours to be removed of the interlayer water.

Upon analysis, the composition of the product was identified to be:

$Mg_{0.683}Al_{0.317}(OH)_2$ (polymerized $Si_{4.26}O_{9.52})_{0.0855}$ $(SO_4)_{0.050}(CO_3)_{0.023}$. $0.11H_2O$. The ratio of B anions in the total electric charge (x) was 0.46; the molar ratio of Si to $Al_2O_3$ was 2.30, the BET specific surface area of the powder was 19 $m^2/g$, average secondary particle diameter was 0.62 $\mu m$ and the adsorption of the surface treating agent was 4.3% by weight.

EXAMPLE 7

Three liters of 2.0 mols/liter $Mg(OH)_2$ slurry was put in a stainless steel vessel and to which 0.750 liter of 2.0 mols/liter $Al(NO_3)_3$ solution was added under stirring, followed by about 30 minutes' stirring. The resulting reaction slurry was transferred to an autoclave and given a hydrothermal treatment at 170° C. for 10 hours. After cooling, filtering and washing the recovered solid with water, the de-watered product was thrown into a stainless steel vessel containing ion-exchange water. Into the vessel, 2.100 liters of 1.0 mol/liter (as $SiO_2$) sodium silicate (No. 3 water glass) solution was added, followed by heating to 90° C. and stirring for 2 hours. Separately, 17.8 g of stearyl phosphate (99%) was weighed and suspended in diluted sodium hydroxide solution at 90° C., and the suspension was poured into the slurry to effect a surface treatment. Finally the system was filtered, and the recovered solid was washed with water and dried at 95° C. for one day and night. So dried product was pulverized to provide the product sample, which was further heat-treated at 200° C. for 3 hours to be removed of the interlayer water.

Upon analysis, the composition of the product was identified to be:

$Mg_{0.750}Al_{0.250}(OH)_2$ (polymerized $Si_{3.17}O_{7.34})_{0.115}(NO_3)_{0.005}(CO_3)_{0.012}$. $0.06H_2O$. The ratio of B anions in the total electric charge (x) was 0.12, the molar ratio of Si to $Al_2O_3$ was 2.80, the BET specific surface area of the powder was 16 $m^2/g$, average secondary particle diameter was 0.68 $\mu m$ and the adsorption of the surface treating agent was 3.3% by weight.

EXAMPLE 8

The procedures up to the hydrothermal treatment of Example 1 were repeated using identical starting materials, and the resulting slurry was cooled, filtered and washed with water. Then the de-watered product was thrown into a stainless steel vessel containing 5 liters of ion-exchange water, stirred, re-slurried, and heated to 90° C. Under stirring, 0.967 liter of 1.0 mol/liter (as $SiO_2$) sodium silicate (No. 3 water glass) solution and 0.333 liter of 1.0 mol/liter (as $SiO_2$) sodium metasilicate solution were added to the slurry, followed by 2 hours' stirring. While continuing the stirring, 21.6 g of sodium stearate (purity: 86%) was separately weighed and dissolved in ion-exchange water at 90° C., and the solution was poured into the slurry under continual stirring to effect a surface treatment. Finally the system was filtered and the recovered solid was washed with water, dried for a day and night at 95° C. and pulverized to provide the product sample. The same product was further heat-treated at 200° C. for 3 hours to be removed of the interlayer water.

Upon analysis, the composition of the product was identified to be:

$Mg_{0.692}Al_{0.308}(OH)_2$ (polymerized and monomeric $Si_{3.37}O_{7.74})_{0.089}(SO_4)_{0.024}(CO_3)_{0.040}$. $0.09H_2O$. The ratio of B anins in the total electric charge (x) was 0.42, the molar ratio of Si to $Al_2O_3$ was 1.95, the BET specific surface area of the powder was 18 $m^2/g$, average secondary particle diameter was 0.77 μm and the adsorption of the surface treating agent was 4.4% by weight.

EXAMPLE 9

The procedures up to the hydrothermal treatment of Example 1 were repeated using identical starting materials, and the resulting slurry was cooled, filtered and washed with water. Then the de-watered product was thrown into a stainless steel vessel containing ion-exchange water, stirred and re-slurried, heated to 80° C. Under stirring, 1.233 liters of 1.0 mol/liter $KH_2PO_4$ solution was added to the slurry, followed by an hour's stirring. Separately, 22.3 g of sodium stearate (purity: 86%) was weighed and dissolved in ion-exchange water at 80° C., and the solution was poured into the slurry under continual stirring to effect a surface treatment. Finally the system was filtered and the recovered solid was washed with water, dried for a day and night at 95° C. and pulverized to provide the product sample. The same product was further heat-treated at 200° C. for 3 hours to be removed of the interlayer water.

Upon analysis, the composition of the product was identified to be:

$Mg_{0.692}Al_{0.308}(OH)_2$ (polymerized $P_{3.31}O_{9.275})_{0086}(SO_4)_{0.020}(CO_3)_{0.048}$ · $0.09H_2O$. The ratio of B anions in the total electric charge (x) was 0.44, the molar ratio of P to $Al_2O_3$ was 1.85, the BET specific surface area of the powder was 23 m²/g, average secondary particle diameter was 0.57 μm and the surface treating agent's adsorption was 4.4% by weight.

EXAMPLE 10

A liquid mixture was prepared by mixing 4 liters of 1.5 mols/liter $MgCl_2$ solution and 1.396 liters of 1.0 mol/liter $Al_2(SO_4)_3$ solution. Also 1.0 mol/liter sodium carbonate solution and 2.0 mols/liter NaOH solution were prepared. The liquid mixture and the sodium carbonate solution were continuously poured into a continuous reaction vessel containing ion-exchange water, at a flow rate of 100 ml/min. and 20 ml/min., respectively, while simultaneously adding the NaOH solution to maintain the reaction pH at 8–10. The residence time was about 20 minutes. After concentration of the reaction product into the slurry became stable, about 5.85 liters of the slurry was sampled, which slurry was filtered, washed with about 2 liters of 0.5 mol/liter sodium carbonate solution, washed with water and suspended in 4.5 liters of ion-exchange water. The resulting slurry was transferred into an autoclave and subjected to a hydrothermal treatment at 170° C. for 12 hours. After cooling, the resulting slurry was transferred into a stainless steel vessel, and into which 0.928 liter of 1.0 mol/liter $H_3PO_4$ solution was added under stirring, stirred for an hour and then heated to 80° C. Separately, 10.3 g of sodium laurate (purity: 99%) was weighed and dissolved in ion-exchange water at 80° C., and the solution was added to the slurry under continual stirring to effect a surface treatment. Finally the system was filtered, washed with water, dried for a day and night at 95° C., and pulverized to provide the product sample which was further heat-treated at 200° C. for 3 hours to be removed of its interlayer water.

Upon analysis, the composition of the product was identified to be:

$Mg_{0.0683}Al_{0.317}(OH)_2$ (polymerized $Si_{1.89}O_{5.725})_{0.1115}(CO_3)_{0.047}$ · $0.11H_2O$. The ratio of B anions in the total electric charge (x) was 0.30, the molar ratio of P to $Al_2O_3$ was 1.33, the BET specific surface area of the powder was 20 m²/g, the average secondary particle diameter was 0.43 μm and the adsorption of the surface treating agent was 2.3% by weight.

EXAMPLE 11

The procedures up to the hydrothermal treatment of Example 1 were repeated using identical starting materials, and the resulting slurry was cooled, filtered and washed with water. Then the de-watered product was thrown into a stainless steel vessel containing ion-exchange water, stirred and re-slurried and heated to 90° C. Under stirring, 0.647 liter of 1.0 mol/liter (as $SiO_2$) sodium silicate (No. 3 water glass) solution and 0.647 liter of 1.0 mol/liter $KH_2PO_4$ solution were added under stirring, followed by further 2 hours' stirring. Separately, 19.2 g of sodium stearate (purity: 86%) was weighed and dissolved in ion-exchange water at 90° C., and the solution was added to the slurry under continued stirring to effect a surface treatment. Finally the system was filtered, washed with water, dried at 95° C. for a day and night, and pulverized to provide a product sample. The product was heat-treated at 200° C. for 3 hours to be removed of the interlayer water.

Upon analysis, the composition of the product was identified to be:

$Mg_{0.692}Al_{0.308}(OH)_2$ (polymerized $Si_{3.36}O_{7.72})_{0.0445}$ (polymerized $P_{3.36}O_{9.40})_{0.0445}(SO_4)_{0.042}(CO_3)_{0.023}$ · $0.11H_2O$. The ratio of B anion the total electric charge (x) was 0.42; the molar ratio of Si to $Al_2O_3$ was 0.97, that of P to $Al_2O_3$ was 0.97, the BET specific surface area of the powder was 20 m²/g, average secondary particle diameter was 0.80 μm and the adsorption of the surface treating agent was 3.9% by weight.

EXAMPLE 12

A liquid mixture of 1.75 liters of 1.5 mols/liter $MgCl_2$ solution, 0.25 liter of 1.5 mols/liter $ZnCl_2$ solution and 0.75 liter of 1.0 mol/liter $Al_2(SO_4)_3$ solution was put in a stainless steel vessel, and to which 3.000 liters of 3.0 mols/liter NaOH solution was poured under stirring, followed by 30 minutes' stirring. The reaction slurry was transferred into an autoclave and given a hydrothermal treatment at 150° C. for 10 hours. The slurry was cooled, filtered and washed with water and the de-watered product was thrown into a stainless steel vessel containing ion-exchange water, stirred and re-slurried. The slurry was heated to 90° C., and into which 0.469 liter of 1.0 mol/liter sodium tetraborate ($Na_2B_4O_7 \cdot 10H_2O$) solution was added under stirring, followed by 2 hours' stirring. Separately, 20.9 g of sodium stearate (purity: 86%) was weighed and dissolved in 90° C. ion-exchange water and the solution was poured into the slurry under continued stirring, to effect a surface treatment. Finally the system was filtered and the recovered solid was washed with water, dried for a day and night at 95° C. and pulverized to provide the product sample. The same product was further heat-treated at 200° C. for 3 hours to be removed of the interlayer water.

Upon analysis, the composition of the product was identified to be:

$(Mg_{0.875}Zn_{0.125})_{0.067}Al_{0.033}(OH)_2$ (polymerized $B_{4.40}O_{7.60})_{0.0945}M(SO_4)_{0.040}(CO_3)_{0.032}$ · $0.07H_2O$. The ratio of B anions in the total electric charge (x) was 0.43; the molar ratio of B to $Al_2O_3$ was 2.50, the BET specific surface area of the powder was 16 m²/g, average secondary particle diameter was 0.66 μm and the adsorption of the surface treating agent was 4.5% by weight.

EXAMPLE 13

A liquid mixture of 1.10 liters of 1.0 mol/liter $Li_2SO_4$ solution and 2.00 liters of 1.0 mol/liter $Al_4(SO_4)_3$ solution was put in a stainless steel vessel, and into which 4.00 liters of 3.0 mols/liter NaOH solution was poured under stirring, followed by about 30 minutes' stirring. The resulting reaction slurry was transferred into an autoclave, subjected to a hydrothermal treatment at 170° C. for 6 hours, cooled, filtered and washed with water. Then the de-watered product was thrown into a stainless steel vessel containing ion-exchange water and heated to 90° C., into which then 1.960 liters of 1.0 mol/liter (as $SiO_2$) sodium silicate (No. 3 water glass) solution was added under stirring, followed by further 3 hours' stirring. Separately, 23.3 g of stearyl phosphate (purity: 99%) was weighed and suspended in 90° C. diluted sodium hydroxide solution. The suspension was poured into the slurry to effect a surface treatment. Finally the system was filtered, and the recovered solid was washed with water and dried for one day and night. So dried product was pulverized to provide the product sample, which was further heat-treated at 200° C. for 3 hours to be removed of the interlayer water.

Upon analysis, the composition of the product was: $Li_{0.97}Al_2(OH)_6$ (polymerized $Si_{2.49}O_{5.98})_{0.393}(SO_4)_{0.752}(CO_3)_{0.017}$. $0.50H_2O$. The ratio of B anions in the total electric charge (x) was 0.19, the molar ratio of Si to $Al_2O_3$ was 0.98, the BET specific surface area of the powder was 19 m²/g, and the average secondary particle diameter was 1.00 μm and the surface treating agent's adsorption was 4.5% by weight.

EXAMPLE 14

A liquid mixture of 1.10 liters of 1.0 mol/liter $Li_2SO_4$ solution, 0.04 liter of 1.0 mol/liter MgCl solution and 2.00 liters of 1.0 mol/liter $Al_2(SO_4)_3$ solution was put in a stainless steel vessel, and into which 4.00 liters of 3.0 mols/liter NaOH solution was poured under stirring, followed by 30 minutes' stirring. Then the reaction slurry was transferred into an autoclave and given a hydrothermal treatment at 170° C. for 6 hours, cooled, filtered and washed with water. Then the de-watered product was thrown into a stainless steel vessel containing ion-exchange water and heated to 90° C., into which then 2.00 liters of 1.0 mol/liter $KH_2PO_4$ solution was added under stirring, followed by further 3 hours' stirring. Separately, 29.6 g of sodium stearate (purity: 86%) was weighed and dissolved in 90° C. ion-exchange water, and the solution was poured into the slurry to effect a surface treatment. Finally the system was filtered, washed with water, dried for a day and night at 95° C., and pulverized to provide the product sample which was further heat-treated at 200° C. for 3 hours to be removed of the interlayer water.

Upon analysis, the composition of the product was identified to be:

$Li_{0.95}Mg_{0.02}Al2(OH)_6$ (polymerized $P_{2.21}O_{6.53})_{0.444}(SO_4)_{0.035}(CO_3)_{0.017}$. $0.60H_2O$. The ratio of B anions to the total electric charge (x) was 0.11, the molar ratio of P to $Al_2O_3$ was 0.98, the BET specific surface area was 18 m²/g, average secondary particle diameter was 0.77 μm and the adsorption of the surface treating agent was 4.4% by weight.

COMPARATIVE EXAMPLE 1

DHT-4A (manufactured by Kyowa Chemical Industries) which is a Mg—Al hydrotalcite compound having carbonate ions in its interlayer and which is currently widely used as an infrared absorbing agent in the field of agricultural film was used as the reference agent.

Upon analysis, it had a composition of $M_{0.683}Al_{0.317}(OH)_2(CO_3)_{0.158}$·$0.56H_2O$. The powder had a BET specific surface area of 15 m²/g, average secondary particle diameter of 0.65 μm and adsorption of the surface treating agent of 2.9% by weight.

COMPARATIVE EXAMPLE 2

The procedures up to the hydrothermal treatment of Example 1 were repeated, and the resulting reaction mixture was cooled, filtered and washed with water. Then the de-watered product was thrown into a stainless steel vessel containing i'on-exchange water, and into which 0.667 liter of 1.0 mol/liter (as $SiO_2$) sodium metasilicate solution was added under stirring, followed by heating to 90° C. and 2 hours' stirring. Separately, 18.2 g of sodium stearate (purity: 86%) was weighed and dissolved in 90° C. ion-exchange water, and the solution was added to the slurry under continued stirring to effect a surface treatment. Finally the system was filtered, washed with water, dried at 95° C. for a day and night, and pulverized to provide a sample product.

Upon analysis, the composition of this product was identified to be:

$Mg_{0.692}Al_{0.308}(OH)_2(HSi_{1.00}O_{3.00})_{0.154}(SO_4)_{0.054}(CO_3)_{0.023}$·$062H_2O$. The ratio of B anions in the total electric charge (x) was 0.50, the molar ratio of Si to $Al_2O_3$ was 1.00, the BET specific surface area was 22 m²/g, average secondary particle diameter was 0.70 μm and the adsorption of the surface treating agent was 4.0% by weight.

COMPARATIVE EXAMPLE 3

A hydrotalcite compound was synthesized following "Embodiment 2" of Hei 8 (1996)-217912A-JP (corres. to EP 708,056).

A liquid mixture of 3 liters of 1.5 mols/liter $MgCl_2$ solution and 0.667 liter of 2.0 mol/liter $AM(NO_3)_3$ solution was put in an autoclave, and into which 2.889 liters of 3.0 mols/liter NaOH solution was poured under stirring, followed by about 30 minutes' stirring and then by a hydrothermal treatment at 170° C. for 12 hours. The system was then cooled to about 70° C., and into which 2.667 liters of 1.0 mol/liter (as $SiO_2$) sodium silicate (No. 3 water glass) solution was added under stirring. The content of autoclave was further stirred for 3 minutes. Separately, 20.4 g of stearyl phosphate (purity: 99%) was weighed and suspended in 70° C. diluted sodium hydroxide solution, which was poured into the autoclave under continued stirring to effect a surface treatment. Finally the system was filtered and the recovered solid was washed with dicarbonated water, dried at 95° C. for a day and night, and pulverized to provide the product sample.

Upon analysis, the composition of this product was identified to be:

$Mg_{0.692}Al0.308(OH)_2$ (polymerized $Si4O9O_{9.00})_{0.154}$·$0.62H_2H_2O$. The ratio of B anions in the total electric charge (x) was 0.00, the molar ratio of Si to $Al_2O_3$ was 4.00, the BET specific surface area was 21 m²/g, average secondary particle diameter was 0.84 μm, and the adsorption of the surface treating agent was 4.0% by weight.

COMPARATIVE EXAMPLE 4

The product of Comparative Example 3 was further heat-treated at 200° C. for 3 hours to be removed of its interlayer water.

Upon analysis, the composition of the product was identified to be:

$Mg_{0.692}Al_{0.308}(OH)_2$ (polymerized $Si4.00O_{9.00})_{0.154}$· $0.04H_2O$. The ratio of B anions in the total electric charge (x) was 0.00, the molar ratio of Si to $Al_2O_3$ was 4.00, the BET specific surface area of the powder was $23 m^2/g$, average secondary particle diameter was 0.80 μm and the adsorption of the surface treating agent was 4.4% by weight.

COMPARATIVE EXAMPLE 5

Two liters of 2.0 mols/liter $AM(OH)_3$ slurry was put in a stainless steel vessel, and into which 88.6 g of $L_2CO_3$ powder was added under stirring, followed by further 30 minutes' stirring. The reaction slurry was transferred to an autoclave and given a hydrothermal treatment at 140° C. for 4 hours. After cooling off, the reaction slurry was transferred to a stainless steel vessel and heated to 80° C. Separately, 16.3 g of sodium stearate (purity: 86%) was weighed and dissolved in 80° C. ion-exchange water. The solution was poured into the slurry to effect a surface treatment. Finally the system was filtered and washed with water, dried at 95° C. for a day and night and pulverized to provide the product sample.

Upon analysis, the composition of the product was identified to be: $Li_{1.00}Al_2(OH)_6(CO_3)_{0.50}$· $3.0H_2O$. The BET specific surface area was 15 $m^2/g$, average secondary particle diameter was 0.90 μm and adsorption of the surface treating agent was 2.9% by weight.

COMPARATIVE EXAMPLE 6

A hydrotalcite compound was synthesized following Example 4 of Hei 9 (1997)-800828A (second)-JP (corres. to U.S. Pat. No. 5,767,179 and EP 778,241).

Two liters of 2.0 mols/liter $AM(OH)_3$ slurry was put in a stainless steel vessel, and into which 88.6 g of $Li_2CO_3$ powder was added under stirring, followed by further 30 minutes' stirring. The reaction slurry was transferred to an autoclave and given a hydrothermal treatment at 140° C. for 4 hours. After cooling the slurry to room temperature, 5.244 liters of 0.5N $HNO_3$ solution was slowly poured into the autoclave under stirring, followed by further 1 hour's stirring. Under continued stirring, 2.010 liters of 1.0 mol/liter sodium silicate (No. 3 water glass) solution was added, followed by another hour's stirring. Then the system was heated to 70° C. and into which 15.7 g of stearyl phosphate (purity: 99%) as suspended in 70° C. diluted sodium hydroxide solution was poured to effect a surface treatment. Finally the system was filtered, washed with decarbonated water, dried at 95° C. for a day and night, and pulverized. Thus obtained product sample was heat-treated at 200° C. for 3 hours to be removed of the interlayer water.

Upon analysis, the composition of the product was identified to be: $Li_{1.00}Al_2(OH)_6$ (polymerized $Si_{2.00}O_{5.00})_{0.500}$·$0.30H_2O$. The ratio of B anions in the total electric charge (x) was. 0.00, the molar ratio of Si to $Al_2O_3$ was 1.00, the BET specific surface area was 15 $m^2/g$, average secondary particle diameter was 0.90 μm and adsorption of the surface treating agent was 3.3% by weight.

COMPARATIVE EXAMPLE 7

A hydrotalcite compound was synthesized following Example 1 of Hei 9 (1997)-800828A (second)-JP (corres. to U.S. Pat. No. 5,767,179 and EP 778,241).

Two liters of 2.0 mols/liter $AM(OH)_3$ slurry was put in a stainless steel vessel, and into which 88.6 g of $Li_2CO_3$ powder and 0.040 liter of 1.0 mol/liter $MgCl_2$ solution were added under stirring, followed by further 30 minutes' stirring. The resulting reaction slurry was transferred into an autoclave and given a hydrothermal treatment at 140° C. for 4 hours. Cooling the system to room temperature, 5.404 liters of 0.5N $HNO_3$ solution was slowly poured into the autoclave under stirring, followed by further 1 hour's stirring. Under continued stirring, 2.090 liters of 1.0 mol/liter sodium silicate (No. 3 water glass) solution was added, followed by another hour's stirring. Then the system was heated to 70° C. and into which 16.3 g of stearyl phosphate (purity: 99%) as suspended in 70° C. diluted sodium hydroxide solution was poured into the autoclave to effect a surface treatment. Finally the system was filtered, washed with decarbonated water, dried at 95° C. for a day and night, and pulverized. Thus obtained product sample was heat-treated at 200° C. for 3 hours to be removed of the interlayer water.

Upon analysis, the composition of the product was identified to be: $Li_{0.98}Mg_{0.02}Al_2(OH)_6$ (polymerized $Si_{2.00}O_{5.00})_{0.51}$· $0.25H_2O$ The ratio of B anions in the total electric charge (x) was 0.00, the molar ratio of Si to $Al_2O_3$ was 1.02, the BET specific surface area was 16 $m^2/g$, average secondary particle diameter was 0.88 μm and adsorption of the surface treating agent was 3.2% by weight.

(Effect in Agricultural Film)

EVA was kneaded with other components according to the following blending recipe, with 100° C. open roll mixer to provide EVA-based resin composition, which was then molded into 100 μm-thick film with 180° C. electric hot pressing machine. As to each of the molded film dispersibility of the infrared absorbing agent which was used therein was evaluated by visual observation based on formation of white blisters, and total light transmission and haze value (degree of haziness) were measured with hazemeter. Also infrared absorbing ability of each film was measured and heat insulation index was calculated.

| (EVA-based resin composition) | |
|---|---|
| Ethylene-vinyl acetate copolymer (vinyl acetate content: 15%, 3758: Nippon Unicar Co.) | 87.4 wt %s |
| Hindered amine photostabilizer (TINUVIN 770: Ciba Geigy) | 0.2 wt % |
| Ultraviolet absorber (TINUVIN 320: Ciba Geigy) | 0.1 wt % |
| Antioxidant (IRGANOX 1076: Ciba Geigy) | 0.1 wt % |
| Antihazing agent | |
| monoglycerine monostearate | 1.5 wt % |
| diglycerine distearate | 0.5 wt % |
| Lubricant (stearic acid amide) | 0.1 wt % |
| Antifogging agent (DS-403: Daikin Kogyo) | 0.1 wt % |
| Infrared absorbing agent (product of one of Examples or Comparative Examples) | 10 wt % |

EXAMPLE 15

In the EVA-based resin composition, the hydrotalcite compound of Example 1 was used as infrared absorbing agent.

EXAMPLE 16

In the EVA-based resin composition, the hydrotalcite compound of Example 2 was used as infrared absorbing agent.

EXAMPLE 17

In the EVA-based resin composition, the hydrotalcite compound of Example 3 was used as infrared absorbing agent.

EXAMPLE 18

In the EVA-based resin composition, the hydrotalcite compound of Example 4 was used as infrared absorbing agent.

EXAMPLE 19

In the EVA-based resin composition, the hydrotalcite compound of Example 5 was used as infrared absorbing agent.

EXAMPLE 20

In the EVA-based resin composition, the hydrotalcite compound of Example 6 was used as infrared absorbing agent.

EXAMPLE 21

In the EVA-based resin composition, the hydrotalcite compound of Example 7 was used as infrared absorbing agent.

EXAMPLE 22

In the EVA-based resin composition, the hydrotalcite compound of Example 8 was used as infrared absorbing agent.

EXAMPLE 23

In the EVA-based resin composition, the hydrotalcite compound of Example 9 was used as infrared absorbing agent.

EXAMPLE 24

In the EVA-based resin composition, the hydrotalcite compound of Example 10 was used as infrared absorbing agent.

EXAMPLE 25

In the EVA-based resin composition, the hydrotalcite compound of Example 11 was used as infrared absorbing agent.

EXAMPLE 26

In the EVA-based resin composition, the hydrotalcite compound of Example 12 was used as infrared absorbing agent.

EXAMPLE 27

In the EVA-based resin composition, the hydrotalcite compound of Example 13 was used as infrared absorbing agent.

EXAMPLE 28

In the EVA-based resin composition, the hydrotalcite compound of Example 14 was used as infrared absorbing agent.

COMPARATIVE EXAMPLE 8

In the EVA-based resin composition, the hydrotalcite compound of Comparative Example 1 was used as infrared absorbing agent.

COMPARATIVE EXAMPLE 9

In the EVA-based resin composition, the hydrotalcite compound of Comparative Example 2 was used as infrared absorbing agent.

COMPARATIVE EXAMPLE 10

In the EVA-based resin composition, the hydrotalcite compound of Comparative Example 3 was used as infrared absorbing agent.

COMPARATIVE EXAMPLE 11

In the EVA-based resin composition, the hydrotalcite compound of Comparative Example 4 was used as infrared absorbing agent.

COMPARATIVE EXAMPLE 12

In the EVA-based resin composition, the hydrotalcite compound of Comparative Example 5 was used as infrared absorbing agent.

COMPARATIVE EXAMPLE 13

In the EVA-based resin composition, the hydrotalcite compound of Comparative Example 6 was used as infrared absorbing agent.

COMPARATIVE EXAMPLE 14

In the EVA-based resin composition, the hydrotalcite compound of Comparative Example 7 was used as infrared absorbing agent.

COMPARATIVE EXAMPLE 15

In the EVA-based resin composition, no infrared absorbing agent was blended.

The result of evaluation and measurements of the films of Examples 15–28 and Comparative Examples 8–15 were as shown in Table 1.

TABLE 1

| | Heat insulation index | Total light transmission | Haze value | Dispersibility (visual observation) |
|---|---|---|---|---|
| Example 15 | 85 | 89 | 4 | good |
| Example 16 | 86 | 90 | 4 | good |
| Example 17 | 86 | 90 | 5 | good |
| Example 18 | 84 | 90 | 4 | good |
| Example 19 | 84 | 90 | 5 | good |
| Example 20 | 86 | 90 | 4 | good |
| Example 21 | 86 | 90 | 5 | good |
| Example 22 | 86 | 90 | 5 | good |
| Example 23 | 85 | 90 | 4 | good |
| Example 24 | 85 | 90 | 5 | good |
| Example 25 | 84 | 90 | 4 | good |
| Example 26 | 84 | 90 | 5 | good |
| Example 27 | 85 | 90 | 5 | good |
| Example 28 | 85 | 90 | 5 | good |
| Comparative Example 8 | 80 | 88 | 10 | good |
| Comparative Example 9 | 82 | 88 | 10 | good |
| Comparative Example 10 | 83 | 89 | 10 | good |
| Comparative Example 11 | 83 | 90 | 14 | good |
| Comparative Example 12 | 80 | 89 | 15 | good |
| Comparative Example 13 | 84 | 89 | 14 | good |

TABLE 1-continued

|  | Heat insulation index | Total light transmission | Haze value | Dispersibility (visual observation) |
|---|---|---|---|---|
| Comparative Example 14 | 84 | 89 | 14 | good |
| Comparative Example 15 | 55 | 92 | 2 | — |

Metallocene PE was used for formulating Metallocene PE-based resin compositions according to the following blending recipe. Each composition was formed with a single screw kneader at 180° C., and then molded to a 100 μm-thick film with a T die extruder at 160° C. The films were evaluated and measured in the identical manner as done with the EVA-based films.

| [Metallocene PE-based resin composition] | |
|---|---|
| Metallocene PE (KF-270: Nippon Polychem Co.) | 87.3 wt % |
| Hindered amine photostabilizer (TINUVIN 622: Ciba Geigy) | 0.2 wt % |
| Ultraviolet absorber (TINUVIN 320: Ciba Geigy) | 0.1 wt % |
| Antioxidant | |
| (IRGANOX 1010: Ciba Geigy) | 0.1 wt % |
| (IRGAFOS 168: Ciba Geigy) | 0.1 wt % |
| Antihazing agent | |
| monoglycerine monostearate | 1.5 wt % |
| diglycerine distearate | 0.5 wt % |
| Lubricant | 0.1 wt % |
| stearic acid amide | |
| Antifogging agent (KF-345, Shin-etsu Chemical Co.) | 0.1 wt % |
| Infrared absorbing agent (Product of one of Examples or Comparative Example) | 10 wt % |

EXAMPLE 29

In the Metallocene PE-based resin composition, the hydrotalcite compound of Example 2 was blended as infrared absorbing agent.

EXAMPLE 30

In the Metallocene PE-based resin composition, the hydrotalcite compound of Example 3 was blended as infrared absorbing agent.

EXAMPLE 31

In the Metallocene PE-based resin composition, the hydrotalcite compound of Example 4 was blended as infrared absorbing agent.

EXAMPLE 32

In the Metallocene PE-based resin composition, the hydrotalcite compound of Example 5 was blended as infrared absorbing agent.

EXAMPLE 33

In the Metallocene PE-based resin composition, the hydrotalcite compound of Example 6 was blended as infrared absorbing agent.

EXAMPLE 34

In the Metallocene PE-based resin composition, the hydrotalcite compound of Example 9 was blended as infrared absorbing agent.

EXAMPLE 35

In the Metallocene PE-based resin composition, the hydrotalcite compound of Example 13 was blended as infrared absorbing agent.

COMPARATIVE EXAMPLE 16

In the Metallocene PE-based resin composition, the hydrotalcite compound of Comparative Example 1 was blended as infrared absorbing agent.

COMPARATIVE EXAMPLE 17

In the Metallocene PE-based resin composition, the hydrotalcite compound of Comparative Example 2 was blended as infrared absorbing agent.

COMPARATIVE EXAMPLE 18

In the Metallocene PE-based resin composition, the hydrotalcite compound of Comparative Example 4 was blended as infrared absorbing agent.

COMPARATIVE EXAMPLE 19

In the Metallocene PE-based resin composition, the hydrotalcite compound of Comparative Example 5 was blended as infrared absorbing agent.

COMPARATIVE EXAMPLE 20

In the Metallocene PE-based resin composition, the hydrotalcite compound of Comparative Example 6 was blended as infrared absorbing agent.

COMPARATIVE EXAMPLE 21

No infrared absorbing agent was blended in the Metallocene PE-based resin composition.

COMPARATIVE EXAMPLE 22

Metallocene PE resin alone was used (without any additive).

The result of the evaluation and measurements the films of Examples 29–35 and Comparative Examples 16–22 were as shown in Table 2.

TABLE 2

|  | Heat insulation index | Total light transmission | Haze value | Dispersibility (visual observation) |
|---|---|---|---|---|
| Example 29 | 77 | 90 | 4 | good |
| Example 30 | 77 | 90 | 5 | good |
| Example 31 | 76 | 90 | 4 | good |
| Example 32 | 75 | 90 | 4 | good |
| Example 33 | 77 | 89 | 5 | good |
| Example 34 | 76 | 90 | 4 | good |
| Example 35 | 77 | 89 | 4 | good |
| Comparative Example 16 | 67 | 89 | 8 | good |
| Comparative Example 17 | 73 | 89 | 8 | good |
| Comparative Example 18 | 77 | 89 | 10 | good |
| Comparative Example 19 | 72 | 88 | 13 | good |
| Comparative Example 20 | 77 | 88 | 11 | good |
| Comparative | 28 | 91 | 3 | — |

TABLE 2-continued

| | Heat insulation index | Total light transmission | Haze value | Dispersibility (visual observation) |
|---|---|---|---|---|
| Example 21 Comparative Example 22 | 28 | 92 | 1 | — |

The above films were given an accelerated deterioration test with Sunshine Weathermeter (Shimazu Seisakusho, Japan). Visual observation after 750 hours' test found the film formed of Metallocene PE only of Comparative Example 22 heavily deteriorated (hardened). Also minor surface deterioration and bleeding occurred in the film of Comparative Example 21 which contained no infrared absorbing agent. All other films in which an infrared absorbing agent was blended showed less extent of surface deterioration compared to the film of Comparative Example 21, and also showed scarcely any bleeding.

PVC (Shin-Etsu Chemical Co.: average molecular weight, 1000) was used for formulating PVC-based resin coinpositions according to the following blending recipe. Each composition was formed by kneading the components with 180° C. open roll mixer and was molded into 100 μm-thick film with 180° C. hot electric pressing machine. The films were evaluated and measured in the identical manner as done with the EVA-based films.

| [PVC-based resin composition] | |
|---|---|
| Polyvinyl chloride (average molecular weight: 1000 (Shin-Etsu Chemical Co) | 57.89 wt % |
| Plasticizer | |
| DOP (dioctyl phthalate) | 30 wt % |
| Tricresyl phosphate | 3 wt % |
| Bisphenol A type epoxy resin | 1.5 wt % |
| Hindered amine photostabilizer (Chimassorb 119: Ciba Geigy) | 0.1 wt % |
| Ultraviolet absorber (TINUVIN 329: Ciba Geigy) | 0.05 wt % |
| Antioxidant (IRGANOX 1076: Ciba Geigy) | 0.05 wt % |
| Antihazing agent sorbitan monopalmitate | 1.0 wt % |
| Antifogging agent (KF-345, Shin-etsu Chemical Co.) | 0.1 wt % |
| Lubricant methylene bis-stearic acid amide | 0.3 wt % |
| Heat stabilizer | |
| Ba-Zn-containing stabilizer | 1.0 wt % |
| Dibenzoylmethane | 0.01 wt % |
| Infrared absorbing agent (One of the products of Examples or comparative materials) | 5. wt % |

EXAMPLE 36

In the PVC-based resin composition, the hydrotalcite compound of Example 3 was used as infrared absorbing agent.

EXAMPLE 37

In the PVC-based resin composition, the hydrotalcite compound of Example 7 was used as infrared absorbing agent.

EXAMPLE 38

In the PVC-based resin composition, the hydrotalcite compound of Example 10 was used as infrared absorbing agent.

EXAMPLE 39

In the PVC-based resin composition, the hydrotalcite compound of Example 14 was used as infrared absorbing agent.

COMPARATIVE EXAMPLE 23

In the PVC-based resin composition, the hydrotalcite compound of Comparative Example 1 was used as infrared absorbing agent.

COMPARATIVE EXAMPLE 24

In the PVC-based resin composition, the hydrotalcite compound of Comparative Example 4 was used as infrared absorbing agent.

COMPARATIVE EXAMPLE 25

In the PVC-based resin composition, the hydrotalcite compound of Comparative Example 7 was used as infrared absorbing agent.

COMPARATIVE EXAMPLE 26

In the PVC-based resin composition, infrared absorbing agent was used.

Results of evaluating the performance of the films of Examples 36–39 and Comparative Examples 23–26 are shown in Table 3.

TABLE 3

| | Heat insulation index | Total light transmission | Haze value | Dispersibility (visual observation) |
|---|---|---|---|---|
| Example 36 | 89 | 91 | 5 | good |
| Example 37 | 89 | 91 | 4 | good |
| Example 38 | 89 | 91 | 4 | good |
| Example 39 | 89 | 91 | 4 | good |
| Comparative Example 23 | 85 | 91 | 5 | good |
| Comparative Example 24 | 88 | 90 | 6 | good |
| Comparative Example 25 | 88 | 91 | 6 | good |
| Comparative Example 26 | 78 | 91 | 3 | — |

Also FIG. 1 shows an IR absorption chart of a 100 μm-thick film of metalocene polyethylene (PE) containing 10 wt % of the hydrotalcite compound (powder) of Example 2 of the present invention.

Figure 2:
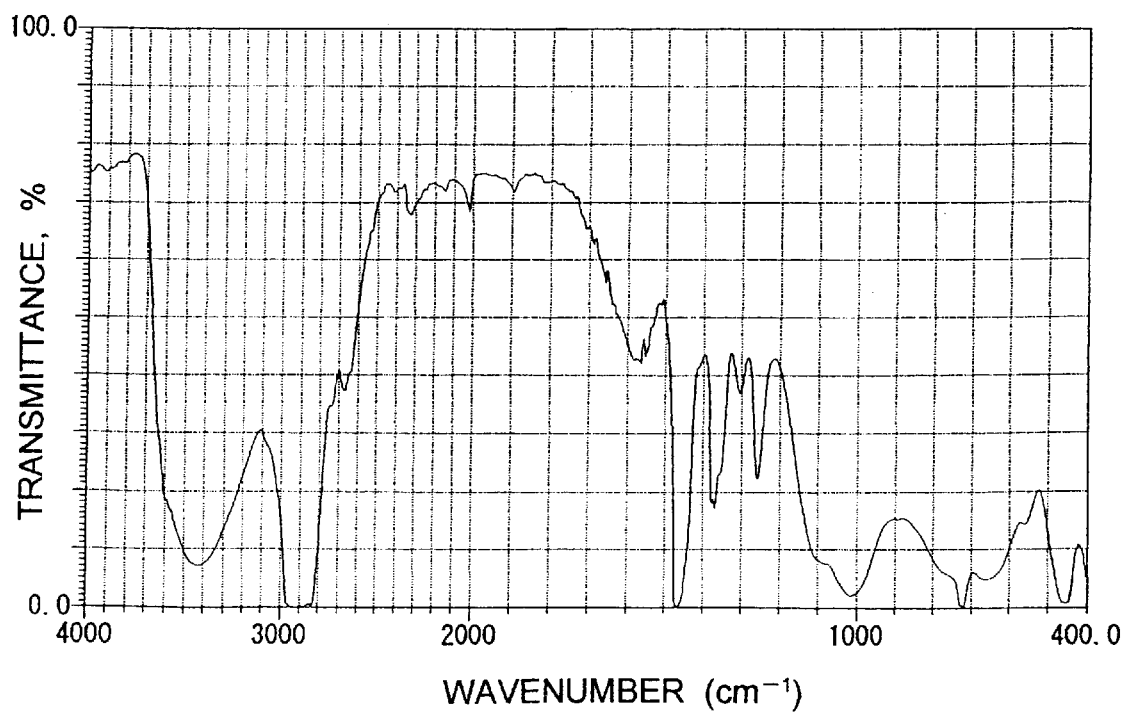
FIG. 2 is an IR absorption chart of a 100 $\mu$m-thick film of metallocene PE containing 10% by weight of the hydrotalcite compound (powder) of the present invention as obtained in Example 3.

FIG. 2 shows an IR absorption chart of a 100 μm-thick film of metallocene PE containing 10 wt % of the hydrotalcite compound (powder) of Example 3 of the present invention.

Figure 3:
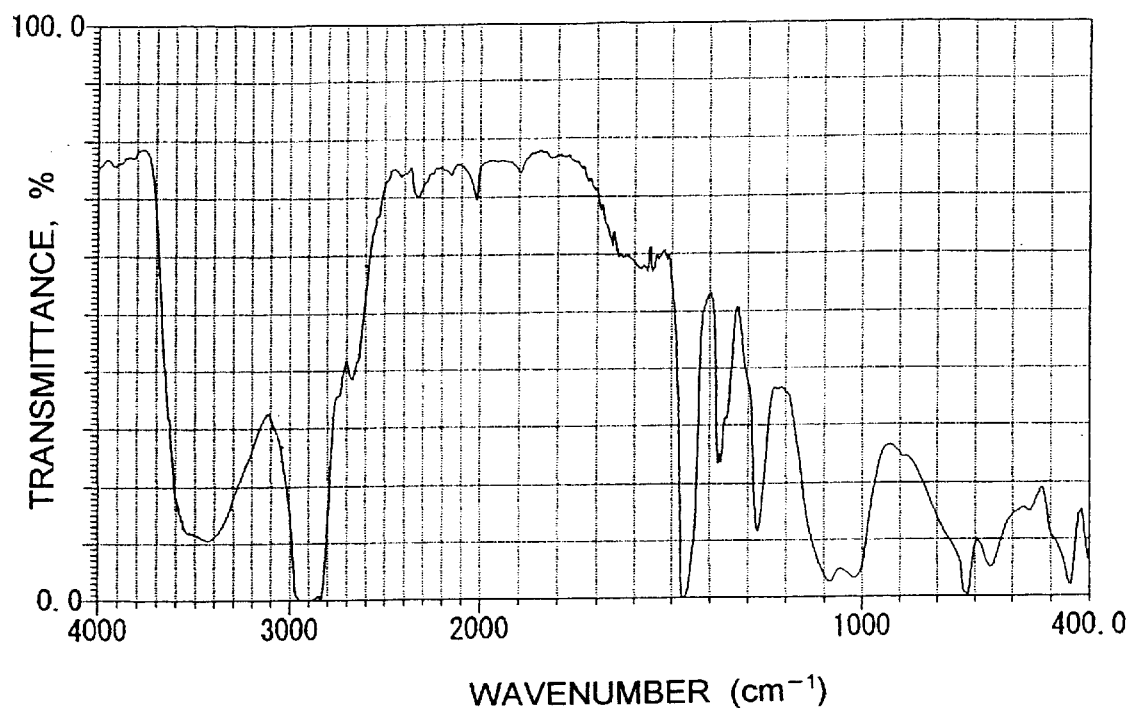
FIG. 3 is an IR absorption chart of a 100 $\mu$m-thick film of metallocene PE containing 10% by weight of the hydrotalcite compound (powder) of the present invention as obtained in Example 9.

FIG. 3 shows an IR absorption chart of a 100 μm-thick film of metallocene PE containing 10 wt % of the hydrotalcite compound (powder) of Example 9 of the present invention.

Figure 4:
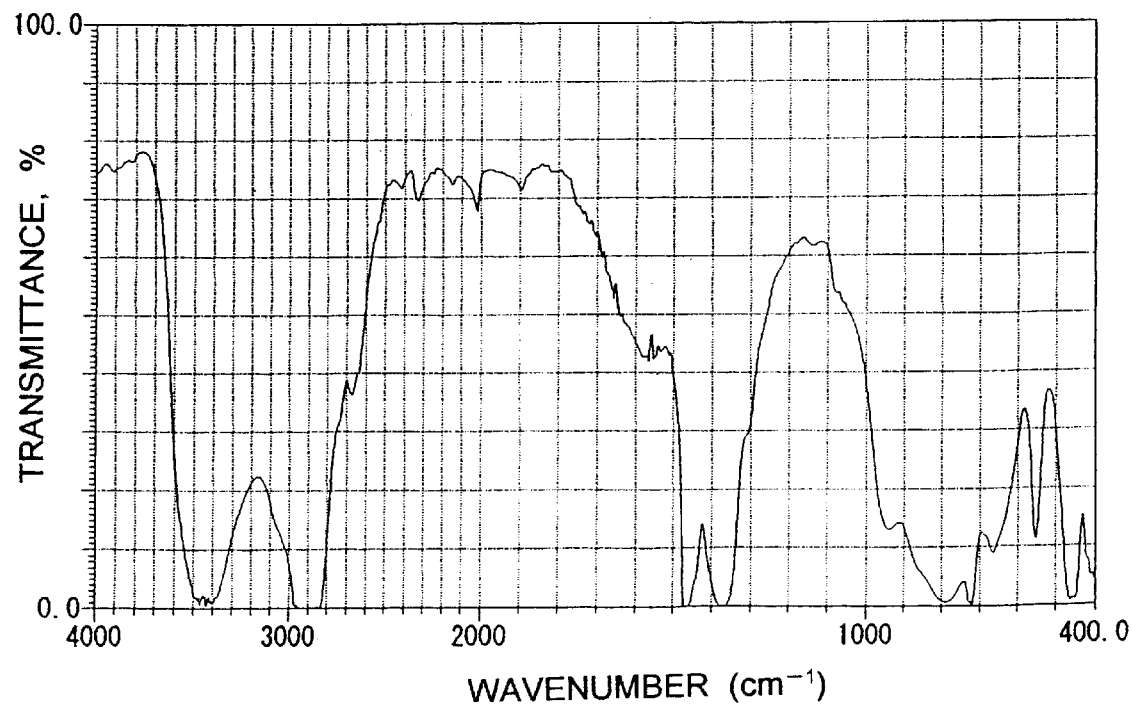
FIG. 4 is an IR absorption chart of a 100 $\mu$m-thick film of metallocene PE containing 10% by weight of the hydrotalcite compound (powder) as obtained in Comparative Example 1.

FIG. 4 shows an IR absorption chart of a 100 μm-thick film of metallocene PE containing 10 wt % of the hydrotalcite compound (powder) of Comparative Example 1.

Figure 5:
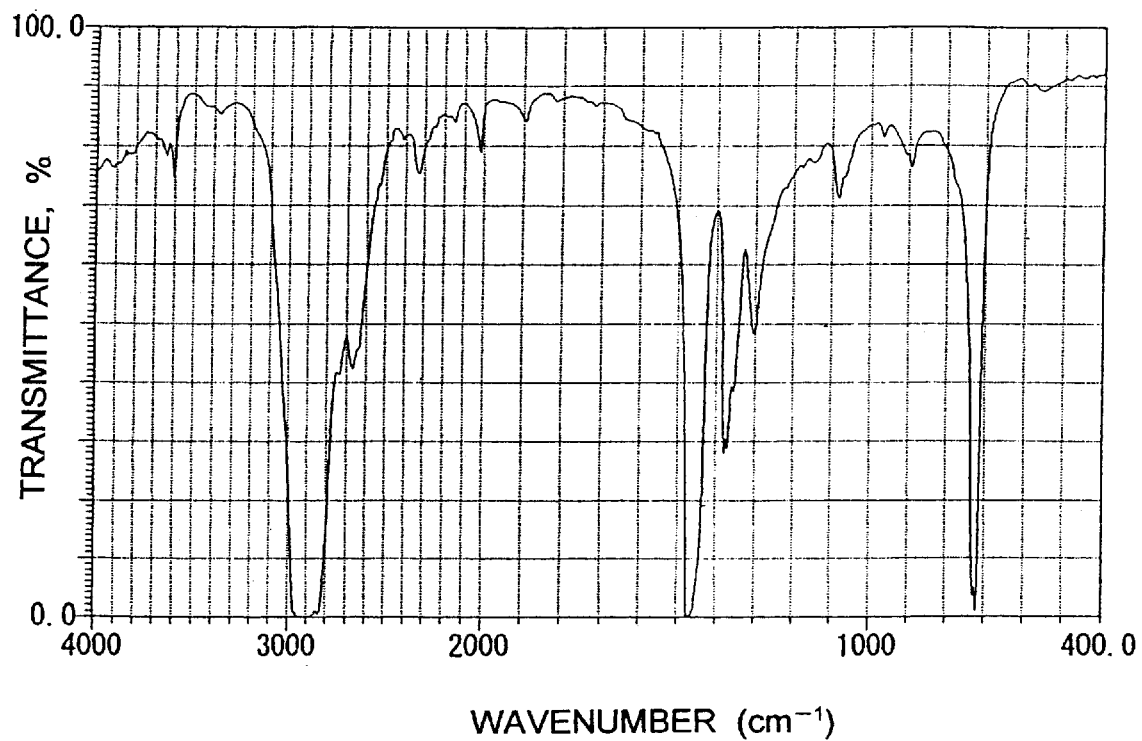
FIG. 5 is an IR absorption chart of a 100 $\mu$m-thick film of metallocene PE alone.

FIG. 5 shows an IR absorption chart of a 100 μm-thick film of metallocene PE alone.

INDUSTRIAL UTILIZABILITY

The hydrotalcite compound which contains as interlayer anions at least one of silicon-, phosphorus- and boron-containing oxygen acid ions, a part or whole of said anions being at least silicon-, phosphorus- and boron-containing polymerized oxygen acid anions; and at least one other kind of anions, exhibits excellent infrared absorbing ability as compared to that of conventional hydrotalcite compounds; and at the same time, when it is blended in thermoplastic resin to be used for agricultural film, it can impart excellent light transmission to the film. In particular, said hydrotalcite compound having an average secondary particle diameter of not more than 5 μm and BET specific surface area of not more than 30 m²/g or the same which is surface-treated shows excellent dispersibility in the thermoplastic resin to be used for making the film. In the occasion of preparing a hydrotalcite compound of the present invention, less cost is incurred when a sulfate ion-type compound is prepared from the time of the synthesizing reaction.

When the hydrotalcite compound of the present invention is contained in agricultural film as infrared absorbing agent, agricultural film excelling in both heat insulation property and light transmission can be provided. Furthermore, by concurrent use of various additives, agricultural film excelling in weatherability, anti-hazing property, anti-fogging property, dust resistance, water repellence, toughness, agricultural chemical resistance, acid precipitation resistance, heat resistance, snti-fading property, antibacterial property, antimold property, spreading processability and prevention of resin degradation caused by the various additives, and furthermore excelling in durability of those favorable properties can be provided.

What is claimed is:

1. A hydrotalcite compound, which has the following formula (1) or (2) and which holds in its interlayer at least a kind of anions selected from silicon-, phosphorus- and boron-containing oxygen acid ions, at least a part of said anions being at least one of silicon-, phosphorus- and boron-containing polymerized oxygen acid ions, and at least a kind of anions other than said oxygen acid anions, (Mg—Al hydrotalcite compound)

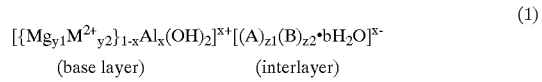

(base layer) (interlayer)

in which $M^{2+}$ stands for at least a kind of divalent metal ion of Zn, Ca and Ni, A stands for at least a kind of anion selected from silicon-, phosphorus- and boron-containing oxygen acid ions, at least a part of which being at least a kind of anion selected from silicon-, phosphorus- and boron-containing polymerized oxygen acid ions, B stands for at least a kind of anion other than the A, and x, $y_1$, $y_2$, $z_1$, $z_2$ and b each satisfies the following condition or conditions:

x: $0<x \leq 0.5$,
$y_1$ and $y_2$: $y_1+y_2=1$, $0<y_1<1$, $0 \leq y_2<1$,
$z_1$ and $z_2$: $0<z_1$, $0<z_2$,
b: $0 \leq b<2$;

(Li—Al hydrotalcite compound)

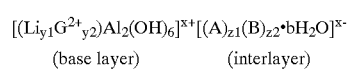

(base layer) (interlayer)

in which $G^{2+}$ stands for at least a kind of divalent metal ion of Mg, Zn, Ca and Ni, A stands for at least a kind of anion selected from silicon-, phosphorus- and boron-containing oxygen acid ions, at least a part of which being at least a kind of anion selected from silicon-, phosphorus- and boron-containing polymerized oxygen acid ions, B stands for at least a kind of anion other than the A, and $y_1$, $y_2$, x, $z_1$, $z_2$ and b each satisfies the following condition or conditions:

$y_1$ and $y_2$: $0<y_1 \leq 1$, $0 \leq y_2<1$,
$0.5 \leq (y_1+y_2) \leq 1$,
x: $x=y_1+2y_2$,
$z_1$ and $z_2$: $0<z_1$, $0<z_2$,
b: $0 \leq b<5$.

2. A hydrotalcite compound as described in claim 1, in which an anion expressed by B in the formula (1) or (2) is at least a kind of anion selected from sulphate ion, carbonate ion, chloride ion and nitrate ion.

3. A hydrotalcite compound as described in claim 1, in which the anion expressed by B in the formula (1) or (2) is at least a kind of anion selected from sulphate ion and carbonate ion.

4. A hydrotalcite compound as described in claim 1, in which the hydrotalcite compound of the formula (1) or (2) satisfies the following formula: $0.1 \leq$(total electric charge number of (B)$z_1$)/$x \leq 0.8$.

5. A hydrotalcite compound as described in claim 1, in which the silicon- and/or phosphorus-containing oxygen acid ions which is the anion expressed as A in the formula (1) is present within the range defined by the following formula wherein Q stands for the mol number of Si and/or P:

$$0<Q/(\text{mol number as } Al_2O_3)<2.$$

6. A hydrotalcite compound as described in claim 1, in which the silicon-containing oxygen acid ions which is the anion expressed as A in the formula (2) is present within the range defined by the following formula wherein R stands for the mol number of Si:

$$0<R/(\text{mol number as } Al_2O_3)<1.$$

7. A hydrotalcite compound as described in claim 1, which is surface-treated with at least a surface treating agent of the group comprising higher fatty acids, anionic surfactants, phosphoric acid esters, nonionic surfactants, silane-, titanate- and aluminum-containing coupling agents and fatty acid esters polyhydric alcohols.

8. A hydrotalcite compound as described in claim 1, which has an average secondary particle diameter of not more than 5 μm and a BET specific surface area of not more than 30 m²/g.

9. An infrared absorbing agent containing as the active ingredient a hydrotalcite compound as described claim 1.

10. An infrared absorbing agent containing as the active ingredient a hydrotalcite compound as described in claim 1, from which a part or whole of the interlayer water has been removed.

11. A process for preparing a hydrotalcite compound as described in claim 1, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

12. A hydrotalcite compound as described in claim 2, in which the anion expressed by B in the formula (1) or (2) is at least a kind of anion selected from sulphate ion and carbonate ion.

13. A hydrotalcite compound as described in claim 2 in which the hydrotalcite compound of the formula (1) or (2) satisfies the following formula: $0.1 \leq$ (total electric charge number of (B)$z_1/x \leq 0.8$.

14. A hydrotalcite compound as described in claim 2, in which the silicon- and/or phosphorus-containing oxygen acid ions which is the anion expressed as A in the formula (1) is present within the range defined by the following formula wherein Q stands for the mol number of Si and/or P:

$$0 < Q/(\text{mol number as Al}_2\text{O}_3) < 2.$$

15. A hydrotalcite compound as described in claim 2, in which the silicon-containing oxygen acid ions which is the anion expressed as A in the formula (2) is present within the range defined by the following formula wherein R stands for the mol number of Si:

$$0 < R/(\text{mol number as Al}_2\text{O}_3) < 1.$$

16. A hydrotalcite compound as described in claim 2, which is surface-treated with at least a surface treating agent of the group comprising higher fatty acids, anionic surfactants, phosphoric acid ester, nonionic surfactants, silane-, titanate- and aluminum-containing coupling agents and fatty acid esters of polyhydric alcohols.

17. A hydrotalcite compound as described in claim 2, which has an average secondary particle diameter of not more than 5 $\mu$m and a BET specific surface area of not more than 30 m$^2$/g.

18. An infrared absorbing agent containing as the active ingredient a hydrotalcite compound as described in claim 2.

19. An infrared absorbing agent containing as the active ingredient a hydrotalcite compound as described in claim 2, from which a part or whole of the interlayer water has been removed.

20. A process for preparing a hydrotalcite compound as described in claim 2, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

21. A hydrotalcite compound as described in claim 3, in which the hydrotalcite compound of the formula (1) or (2) satisfies the following formula: $0.1 \leq$ (total electric charge number of (B)$z_1/x \leq 0.8$.

22. A hydrotalcite compound as described in claim 3, in which the silicon- and/or phosphorus-containing oxygen acid ions which is the anion expressed as A in the formula (1) is present within the range defined by the following formula wherein Q stands for the mol number of Si and/or P:

$$0 < Q/(\text{mol number as Al}_2\text{O}_3) < 2.$$

23. A hydrotalcite compound as described in claim 3, in which the silicon-containing oxygen acid ions which is the anion expressed as A in the formula (2) is present within the range defined by the following formula wherein R stands for the mol number of Si:

$$0 < R/(\text{mol number as Al}_2\text{O}_3) < 1.$$

24. A hydrotalcite compound as described in claim 3, which is surface-treated with at least a surface treating agent of the group comprising higher fatty acids, anionic surfactants, phosphoric acid esters, nonionic surfactants, silane-, titanate- and aluminum-containing coupling agents and fatty acid esters of polyhydric alcohols.

25. A hydrotalcite compound as described in claim 3, which has an average secondary particle diameter of not more than 5 $\mu$m and a BET specific surface area of not more than 30 m$^2$/g.

26. An infrared absorbing agent containing as the active ingredient a hydrotalcite compound as described in claim 3.

27. An infrared absorbing agent containing as the active ingredient a hydrotalcite compound as described in claim 3, from which a part or whole of the interlayer water has been removed.

28. A process for preparing a hydrotalcite compound as described in claim 3, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

29. A hydrotalcite compound as described in claim 4, in which the silicon- and/or phosphorus-containing oxygen acid ions which is the anion expressed as A in the formula (1) is present within the range defined by the following formula wherein Q stands for the mol number of Si and/or P:

$$0 < Q/(\text{mol number as Al}_2\text{O}_3) < 2.$$

30. A hydrotalcite compound as described in claim 4, in which the silicon-containing oxygen acid ions which is the anion expressed as A in the formula (2) is present within the range defined by the following formula wherein R stands for the mol number of Si:

$$0 < R/(\text{mol number as Al}_2\text{O}_3) < 1.$$

31. A hydrotalcite compound as described in claim 4, which is surface-treated with at least a surface treating agent of the group comprising higher fatty acids, anionic surfactants, phosphoric acid esters, nonionic surfactants, silane-, titanate- and aluminum-containing coupling agents and fatty acid esters of polyhydric alcohols.

32. A hydrotalcite compound as described in claim 4, which has an average secondary particle diameter of not more than 5 $\mu$m and a BET specific surface area of not more than 30 m$^2$/g.

33. An infrared absorbing agent containing as the active ingredient a hydrotalcite compound as described in claim 4.

34. An infrared absorbing agent containing as the active ingredient a hydrotalcite compound as described in claim 4, from which a part or whole of the interlayer water has been removed.

35. A process for preparing a hydrotalcite compound as described in claim 4, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

36. A hydrotalcite compound as described in claim 5, which is surface-treated with at least a surface treating agent of the group comprising higher fatty acids, anionic surfactants, phosphoric acid esters, nonionic surfactants, silane-, titanate- and aluminum-containing coupling agents and fatty acid esters of polyhydric alcohols.

37. A hydrotalcite compound as described in claim 5, which has an average secondary particle diameter of not more than 5 µm and a BET specific surface area of not more than 30 m$^2$/g.

38. An infrared absorbing agent containing as the active ingredient a hydrotalcite compound as described in claim 5.

39. An infrared absorbing agent containing as the active ingredient a hydrotalcite compound as described in claim 5, from which a part or whole of the interlayer water has been removed.

40. A process for preparing a hydrotalcite compound as described in claim 5, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

41. A hydrotalcite compound as described in claim 6, which is surface-treated with at least a surface treating agent of the group comprising higher fatty acids, anionic surfactants, phosphoric acid esters, nonionic surfactants, silane-, titanate- and aluminum-containing coupling agents and fatty acid esters of polyhydric alcohols.

42. A hydrotalcite compound as described in claim 6, which has an average secondary particle diameter of not more than 5 µm and a BET specific surface area of not more than 30 m$^2$/g.

43. An infrared absorbing agent containing as the active ingredient a hydrotalcite compound as described in claim 6.

44. An infrared absorbing agent containing as the active ingredient a hydrotalcite compound as described in claim 6 from which a part or whole of the interlayer water has been removed.

45. A process for preparing a hydrotalcite compound as described in claim 6, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

46. A hydrotalcite compound as described in claim 7, which has an average secondary particle diameter of not more than 5 µm and a BET specific surface area of not more than 30 m$^2$/g.

47. An infrared absorbing agent containing as the active ingredient a hydrotalcite compound as described in claim 7.

48. An infrared absorbing agent containing as the active ingredient a hydrotalcite compound as described in claim 7, from which a part or whole of the interlayer water has been removed.

49. A process for preparing a hydrotalcite compound as described in claim 7, which comprises preparing in advance a hydrotalcite compound whose interlayer anions are mainly sulfate ions at the time of the synthesizing reaction, and thereafter exchanging the ions with at least a kind of anion of silicon-, phosphorus- and boron-containing oxygen acid ions, a part or whole of said ions being at least one of silicon-, phosphorus- and boron-containing polymerized oxygen acid ions, at temperatures ranging from 60–100° C.

50. An infrared absorbing agent containing as the active ingredient a hydrotalcite compound as described in claim 8.

51. An infrared absorbing agent containing as the active ingredient a hydrotalcite compound as described in claim 8, from which a part or whole of the interlayer water has been removed.

52. An agricultural film having a film structure containing 1–30% by weight of the thermoplastic resin constituting said film of at least an infrared absorbing agent which is described in claim 9.

53. An agricultural film having a film structure containing 1–30% by weight of the thermoplastic resin constituting said film of at least an infrared absorbing agent which is described in claim 10.

* * * * *